(12) United States Patent
Zhang et al.

(10) Patent No.: US 12,652,564 B2
(45) Date of Patent: Jun. 9, 2026

(54) INTER-USER EQUIPMENT CROSS LINK INTERFERENCE REPORTING

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Sony Akkarakaran, Poway, CA (US); Jelena Damnjanovic, Del Mar, CA (US); Tao Luo, San Diego, CA (US); Junyi Li, Fairless Hills, PA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 17/888,769

(22) Filed: Aug. 16, 2022

(65) Prior Publication Data

US 2024/0064549 A1 Feb. 22, 2024

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/336* (2015.01); *H04W 76/14* (2018.02); *H04W 92/18* (2013.01)

(58) Field of Classification Search
None
See application file for complete search history.

(56) References Cited

U.S. PATENT DOCUMENTS

2020/0120529 A1 4/2020 Wu et al.
2022/0015114 A1 1/2022 Xu et al.
(Continued)

FOREIGN PATENT DOCUMENTS

KR 20210056485 A * 5/2021 ........ H04W 72/0453
WO WO-2022029196 A1 2/2022
WO WO2023211950 * 4/2022

OTHER PUBLICATIONS

International Search Report and Written Opinion—PCT/US2023/030241—ISA/EPO—Nov. 8, 2023 (2203398WO).

*Primary Examiner* — Mohammad S Adhami
(74) *Attorney, Agent, or Firm* — Paul M. McAdams; Holland & Hart LLP

(57) ABSTRACT

Methods, systems, and devices for wireless communications are described. Some wireless communications systems may support inter-user equipment (UE) cross-link interference (CLI) reduction. For example, a first UE may receive sidelink signaling from one or more other UEs and may generate measurement information associated with inter-UE cross link interference between the first UE and the one or more other UEs based on the sidelink signaling. Further, the first UE may transmit, to a network entity, an inter-UE cross link interference report that includes information indicative of a first set of one or more UEs from among the one or more other UEs, where each UE of the first set of one or more UEs is associated with respective measurement information of the measurement information that satisfies a threshold.

29 Claims, 16 Drawing Sheets

(51) Int. Cl.
    *H04W 76/14*       (2018.01)
    *H04W 92/18*       (2009.01)

(56)            References Cited

U.S. PATENT DOCUMENTS

2022/0124533 A1 *   4/2022   Li ........................ H04W 24/10
2023/0189382 A1 *   6/2023   Haustein .............. H04W 76/20
                                              370/329

* cited by examiner 305-a

Figures 3A, 3B:
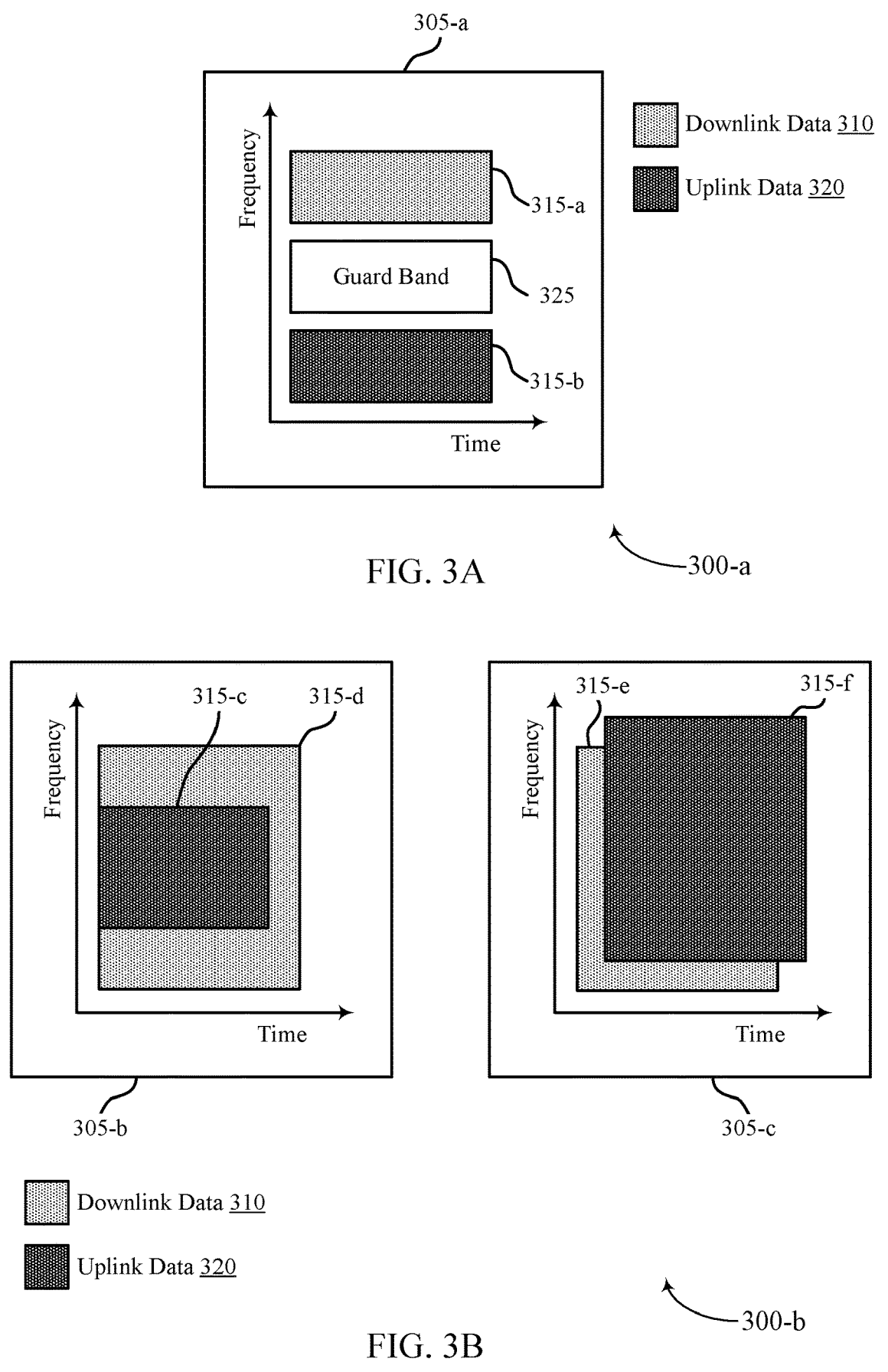

Frequency

Downlink Data 310

Uplink Data 320

315-a

Guard Band

325

315-b

Time

FIG. 3A 300-a 315-c     315-d

Frequency

Time 305-b 315-e     315-f

Frequency

Time 305-c

Downlink Data 310

Uplink Data 320

Network
Entity

Transceiver                    Antenna 1310                           1315

Memory

Code

1330

Communications
Manager                        1325

1320

1340                           Processor

1335

1300

1305

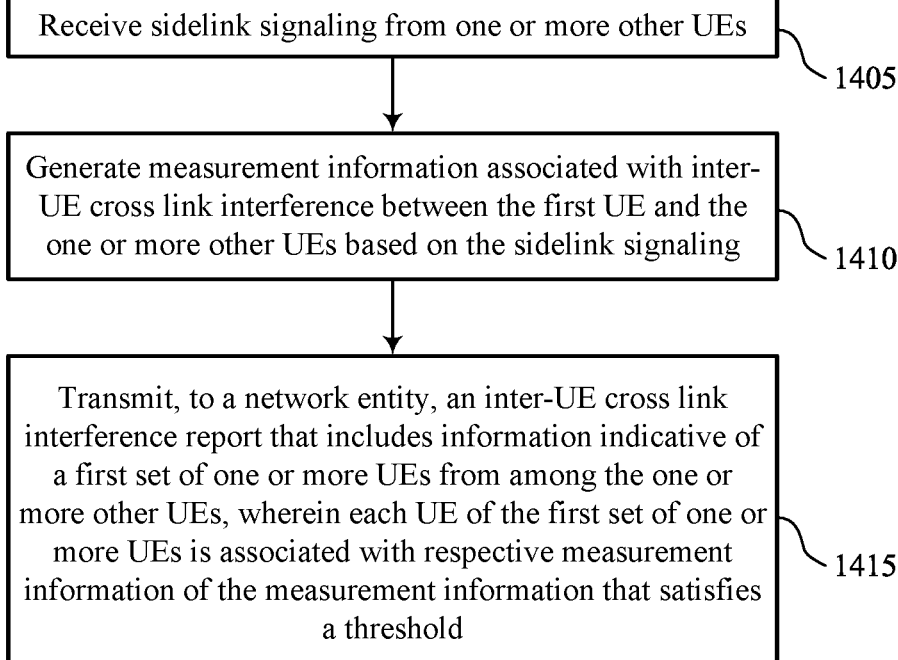

Receive sidelink signaling from one or more other UEs

1405

Generate measurement information associated with inter-UE cross link interference between the first UE and the one or more other UEs based on the sidelink signaling

1410

Transmit, to a network entity, an inter-UE cross link interference report that includes information indicative of a first set of one or more UEs from among the one or more other UEs, wherein each UE of the first set of one or more UEs is associated with respective measurement information of the measurement information that satisfies a threshold

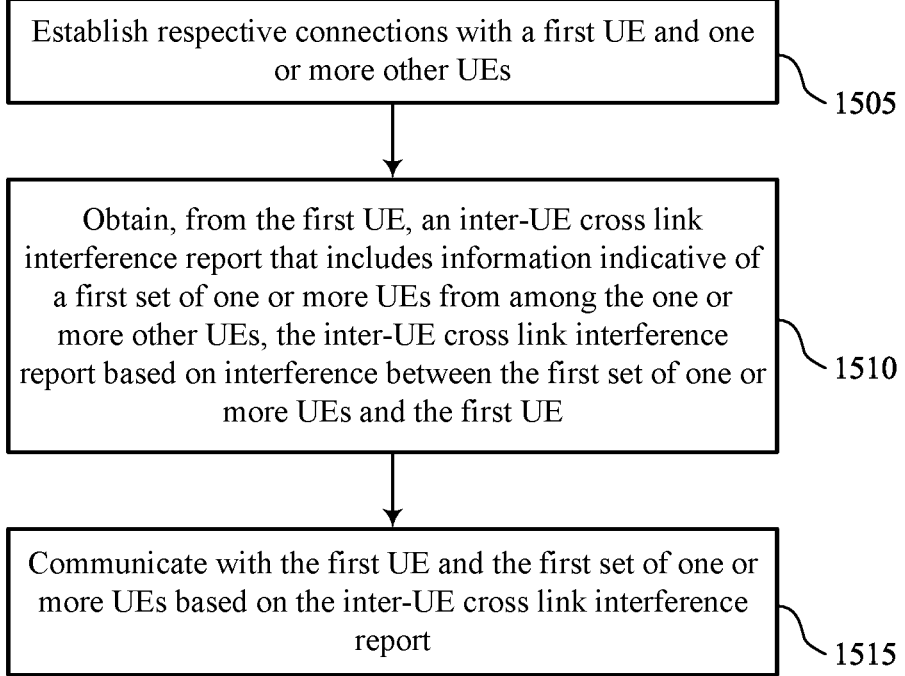

Establish respective connections with a first UE and one or more other UEs

1505

Obtain, from the first UE, an inter-UE cross link interference report that includes information indicative of a first set of one or more UEs from among the one or more other UEs, the inter-UE cross link interference report based on interference between the first set of one or more UEs and the first UE

1510

Communicate with the first UE and the first set of one or more UEs based on the inter-UE cross link interference report

INTER-USER EQUIPMENT CROSS LINK INTERFERENCE REPORTING

INTRODUCTION

The following relates to wireless communications, including inter-user equipment cross link interference reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support inter-user equipment (UE) cross link interference (CLI) reduction. Generally, the techniques described herein may enable a first UE to generate measurement information associated with inter-UE CLI between the first UE and one or more other UEs and transmit, to a network entity, an inter-UE CLI report based on the measurement information. For example, the first UE may receive sidelink signaling from the one or more other UEs and may generate the measurement information associated with inter-UE CLI between the first UE and the one or more other UEs based on the sidelink signaling. Additionally, the first UE may transmit, to the network entity, an inter-UE CLI report that includes information indicative of a first set of one or more UEs from among the one or more other UEs, where each UE of the first set of one or more UEs is associated with respective measurement information of the measurement information that satisfies a threshold.

In some examples, the information indicative of the first set of one or more UEs may include a respective identifier for each respective UE of the first set of one or more UEs. Additionally, or alternatively, the measurement information may include a respective signal receive power for each respective UE of the one or more other UEs. In some examples, the first UE may determine, from among the one or more other UEs, one or more UEs for which the respective signal receive power exceeds the threshold, where the first set of one or more UEs includes the one or more UEs for which the respective signal receive power exceeds the threshold. Additionally, or alternatively, the first UE may determine, from among the one or more other UEs, one or more UEs for which the respective signal receive power is below the threshold, where the first set of one or more UEs comprises the one or more UEs for which the respective signal receive power is below the threshold.

A method for wireless communications at a first UE is described. The method may include receiving sidelink signaling from one or more other UEs, generating measurement information associated with inter-UE CLI between the first UE and the one or more other UEs based on the sidelink signaling, and transmitting, to a network entity, an inter-UE CLI report that includes information indicative of a first set of one or more UEs from among the one or more other UEs, where each UE of the first set of one or more UEs is associated with respective measurement information of the measurement information that satisfies a threshold.

An apparatus for wireless communications at a first UE is described. The apparatus may include a processor, memory coupled with the processor, and instructions stored in the memory. The instructions may be executable by the processor to cause the apparatus to receive sidelink signaling from one or more other UEs, generate measurement information associated with inter-UE CLI between the first UE and the one or more other UEs based on the sidelink signaling, and transmit, to a network entity, an inter-UE CLI report that includes information indicative of a first set of one or more UEs from among the one or more other UEs, where each UE of the first set of one or more UEs is associated with respective measurement information of the measurement information that satisfies a threshold.

Another apparatus for wireless communications at a first UE is described. The apparatus may include means for receiving sidelink signaling from one or more other UEs, means for generating measurement information associated with inter-UE CLI between the first UE and the one or more other UEs based on the sidelink signaling, and means for transmitting, to a network entity, an inter-UE CLI report that includes information indicative of a first set of one or more UEs from among the one or more other UEs, where each UE of the first set of one or more UEs is associated with respective measurement information of the measurement information that satisfies a threshold.

A non-transitory computer-readable medium storing code for wireless communications at a first UE is described. The code may include instructions executable by a processor to receive sidelink signaling from one or more other UEs, generate measurement information associated with inter-UE CLI between the first UE and the one or more other UEs based on the sidelink signaling, and transmit, to a network entity, an inter-UE CLI report that includes information indicative of a first set of one or more UEs from among the one or more other UEs, where each UE of the first set of one or more UEs is associated with respective measurement information of the measurement information that satisfies a threshold.

In some examples of the method, apparatuses, and non-transitory computer-readable medium described herein, the information indicative of the first set of one or more UEs includes a respective identifier for each respective UE of the first set of one or more UEs.

In some examples of the method, apparatuses, and non-transitory computer-readable medium described herein, the measurement information includes a respective signal receive power for each respective UE of the one or more other UEs and the method, apparatuses, and non-transitory computer-readable medium may include further operations, features, means, or instructions for determining, from among the one or more other UEs, one or more UEs for which the respective signal receive power exceeds the threshold, where the first set of one or more UEs includes the one or more UEs for which the respective signal receive power exceeds the threshold.

In some examples of the method, apparatuses, and non-transitory computer-readable medium described herein, the measurement information includes a respective signal receive power for each respective UE of the one or more other UEs and the method, apparatuses, and non-transitory computer-readable medium may include further operations, features, means, or instructions for determining, from among the one or more other UEs, one or more UEs for which the respective signal receive power may be below the threshold, where the first set of one or more UEs includes the one or more UEs for which the respective signal receive power may be below the threshold.

Some examples of the method, apparatuses, and non-transitory computer-readable medium described herein may further include operations, features, means, or instructions for receiving information indicative of a quantity of UEs for the first UE to indicate in the inter-UE CLI report via the information indicative of the first set of one or more UEs and determining, from among the one or more other UEs, a subset of one or more UEs including the quantity of UEs, where the first set of one or more UEs includes the subset of one or more UEs, and where each UE of the first set of one or more UEs may be associated with a respective measurement information value of the measurement information that is: greater than a corresponding measurement information value for each UE of the one or more other UEs not in the subset, where the threshold includes a lowest respective measurement information value associated with the subset of one or more UEs, or less than a corresponding measurement information value for each UE of the one or more other UEs not in the subset, where the threshold includes a highest respective measurement information value associated with the subset of one or more UEs.

In some examples of the method, apparatuses, and non-transitory computer-readable medium described herein, the inter-UE CLI report includes information indicative of a respective transmit beam associated with the respective measurement information corresponding to each respective UE of the first set of one or more UEs.

In some examples of the method, apparatuses, and non-transitory computer-readable medium described herein, the inter-UE CLI report includes information indicative of a respective receive beam associated with the respective measurement information corresponding to each respective UE of the first set of one or more UEs.

In some examples of the method, apparatuses, and non-transitory computer-readable medium described herein, the inter-UE CLI report includes information indicative of respective time and frequency resources associated with the respective measurement information corresponding to each respective UE of the first set of one or more UEs.

In some examples of the method, apparatuses, and non-transitory computer-readable medium described herein, the inter-UE CLI report includes information indicative of a respective pathloss between each respective UE of the first set of one or more UEs and the first UE.

In some examples of the method, apparatuses, and non-transitory computer-readable medium described herein, the inter-UE CLI report includes first information indicative of whether each respective UE of the first set of one or more UEs may be within a coverage area of a network that includes the network entity.

In some examples of the method, apparatuses, and non-transitory computer-readable medium described herein, for each respective UE of the first set of one or more UEs that may be within the coverage area of the network, the first information may be indicative of a network cell identifier associated with the respective UE.

In some examples of the method, apparatuses, and non-transitory computer-readable medium described herein, for each respective UE of the first set of one or more UEs that may be outside the coverage area of the network, the first information may be indicative of a respective invalid cell identifier or no cell identifier.

In some examples of the method, apparatuses, and non-transitory computer-readable medium described herein, the inter-UE CLI report excludes information indicative of a second set of one or more UEs from the one or more other UEs based on each respective UE of the second set of one or more UEs being outside a coverage area of a network that includes the network entity.

In some examples of the method, apparatuses, and non-transitory computer-readable medium described herein, a particular UE from among the one or more other UEs may be associated with respective measurement information that satisfies the threshold and the inter-UE CLI report excludes information indicative of the particular UE based on the particular UE being outside a coverage area of a network that includes the network entity.

In some examples of the method, apparatuses, and non-transitory computer-readable medium described herein, the sidelink signaling from the one or more other UEs may be associated with one or more beams that may be also associated with uplink or downlink communication between the network entity and the one or more other UEs.

In some examples of the method, apparatuses, and non-transitory computer-readable medium described herein, the sidelink signaling from the one or more other UEs may be associated with one or more first beams that may be quasi-colocated (QCL'ed) with one or more second beams associated with uplink or downlink communication between the network entity and the one or more other UEs.

In some examples of the method, apparatuses, and non-transitory computer-readable medium described herein, the inter-UE CLI report includes information indicative of respective location information corresponding to each respective UE of the first set of one or more UEs.

Some examples of the method, apparatuses, and non-transitory computer-readable medium described herein may further include operations, features, means, or instructions for receiving second information indicating of respective indication of respective location information corresponding to each of the one or more other UEs.

In some examples of the method, apparatuses, and non-transitory computer-readable medium described herein, the inter-UE CLI report excludes information indicative of a second set of one or more UEs from the one or more other UEs based on each respective UE of the second set of one or more UEs being greater than a threshold distance away from the first UE.

In some examples of the method, apparatuses, and non-transitory computer-readable medium described herein, each respective UE of the first set of one or more UEs may be within a threshold distance of the first UE and the inter-UE CLI report includes the information indicative of the first set of one or more UEs based on each respective UE of the first set of one or more UEs being within the threshold distance.

In some examples of the method, apparatuses, and non-transitory computer-readable medium described herein, the sidelink signaling includes one of more discovery signals, one or more synchronization signal blocks (SSBs), or one or more sidelink control information (SCI) transmissions.

Some examples of the method, apparatuses, and non-transitory computer-readable medium described herein may further include operations, features, means, or instructions for identifying, from among the one or more other UEs, a UE associated with respective measurement information that satisfies the threshold and refraining from indicating the UE in the interference report based on the UE being outside a coverage area of a network that includes the network entity.

Some examples of the method, apparatuses, and non-transitory computer-readable medium described herein may further include operations, features, means, or instructions for determining that the one or more indicated UEs may be each within a threshold distance threshold of the first UE, the one or more indicated UEs being indicated by the interference report based on the one or more indicated UEs each being within the threshold distance threshold of the first UE.

A method for wireless communications at a network entity communication is described. The method may include establishing respective connections with a first UE and one or more other UEs, obtaining, from the first UE, an inter-UE CLI report that includes information indicative of a first set of one or more UEs from among the one or more other UEs, the inter-UE CLI report based on interference between the first set of one or more UEs and the first UE, and communicating with the first UE and the first set of one or more UEs based on the inter-UE CLI report.

An apparatus for wireless communications at a network entity communication is described. The apparatus may include a processor, memory coupled with the processor, and instructions stored in the memory. The instructions may be executable by the processor to cause the apparatus to establish respective connections with a first UE and one or more other UEs, obtain, from the first UE, an inter-UE CLI report that includes information indicative of a first set of one or more UEs from among the one or more other UEs, the inter-UE CLI report based on interference between the first set of one or more UEs and the first UE, and communicate with the first UE and the first set of one or more UEs based on the inter-UE CLI report.

Another apparatus for wireless communications at a network entity communication is described. The apparatus may include means for establishing respective connections with a first UE and one or more other UEs, means for obtaining, from the first UE, an inter-UE CLI report that includes information indicative of a first set of one or more UEs from among the one or more other UEs, the inter-UE CLI report based on interference between the first set of one or more UEs and the first UE, and means for communicating with the first UE and the first set of one or more UEs based on the inter-UE CLI report.

A non-transitory computer-readable medium storing code for wireless communications at a network entity communication is described. The code may include instructions executable by a processor to establish respective connections with a first UE and one or more other UEs, obtain, from the first UE, an inter-UE CLI report that includes information indicative of a first set of one or more UEs from among the one or more other UEs, the inter-UE CLI report based on interference between the first set of one or more UEs and the first UE, and communicate with the first UE and the first set of one or more UEs based on the inter-UE CLI report.

In some examples of the method, apparatuses, and non-transitory computer-readable medium described herein, the information indicative of the first set of one or more UEs includes a respective identifier for each respective UE of the first set of one or more UEs and each of the first set of one or more UEs may be associated with respective measurement information that satisfies a threshold.

In some examples of the method, apparatuses, and non-transitory computer-readable medium described herein, the inter-UE CLI report includes information indicative of a respective transmit beam or a respective receive beam associated with respective measurement information corresponding to each respective UE of the first set of one or more UEs.

In some examples of the method, apparatuses, and non-transitory computer-readable medium described herein, the inter-UE CLI report includes first information indicative of whether each respective UE of the first set of one or more UEs may be within a coverage area of a network that includes the network entity.

Some examples of the method, apparatuses, and non-transitory computer-readable medium described herein may further include operations, features, means, or instructions for outputting a control message indicating that the first UE may be to refrain from indicating via the information in the inter-UE CLI report any UE that may be outside a coverage area of a network that includes the network entity.

In some examples of the method, apparatuses, and non-transitory computer-readable medium described herein, the interference between the first set of one or more UEs and the first UE may be associated with one or more beams that may be also associated with uplink or downlink communication between the network entity and the first set of one or more UEs.

In some examples of the method, apparatuses, and non-transitory computer-readable medium described herein, the interference between the first set of one or more UEs and the first UE may be associated with one or more first beams that may be QCL'ed with one or more second beams associated with uplink or downlink communication between the network entity and the first set of one or more UEs.

In some examples of the method, apparatuses, and non-transitory computer-readable medium described herein, the inter-UE CLI report includes information indicative of respective location information corresponding to each respective UE of the first set of one or more UEs.

Some examples of the method, apparatuses, and non-transitory computer-readable medium described herein may further include operations, features, means, or instructions for performing interference mitigation based on the inter-UE CLI report and communicating with the first UE and the first set of one or more UEs based on the interference mitigation.

Some examples of the method, apparatuses, and non-transitory computer-readable medium described herein may further include operations, features, means, or instructions for identify, from among the one or more other UEs, a UE associated with respective measurement information that satisfies the threshold and refrain from indicating the UE in the interference report based on the UE being outside a coverage area of a network that includes the network entity.

BRIEF DESCRIPTION OF THE DRAWINGS

FIGS. 3A and 3B illustrate examples of a full-duplex operation scheme that supports inter-UE CLI reporting in accordance with one or more aspects of the present disclosure.

FIGS. 14 and 15 show flowcharts illustrating methods that supports inter-UE CLI reporting in accordance with one or more aspects of the present disclosure.

DETAILED DESCRIPTION

Figure 1:
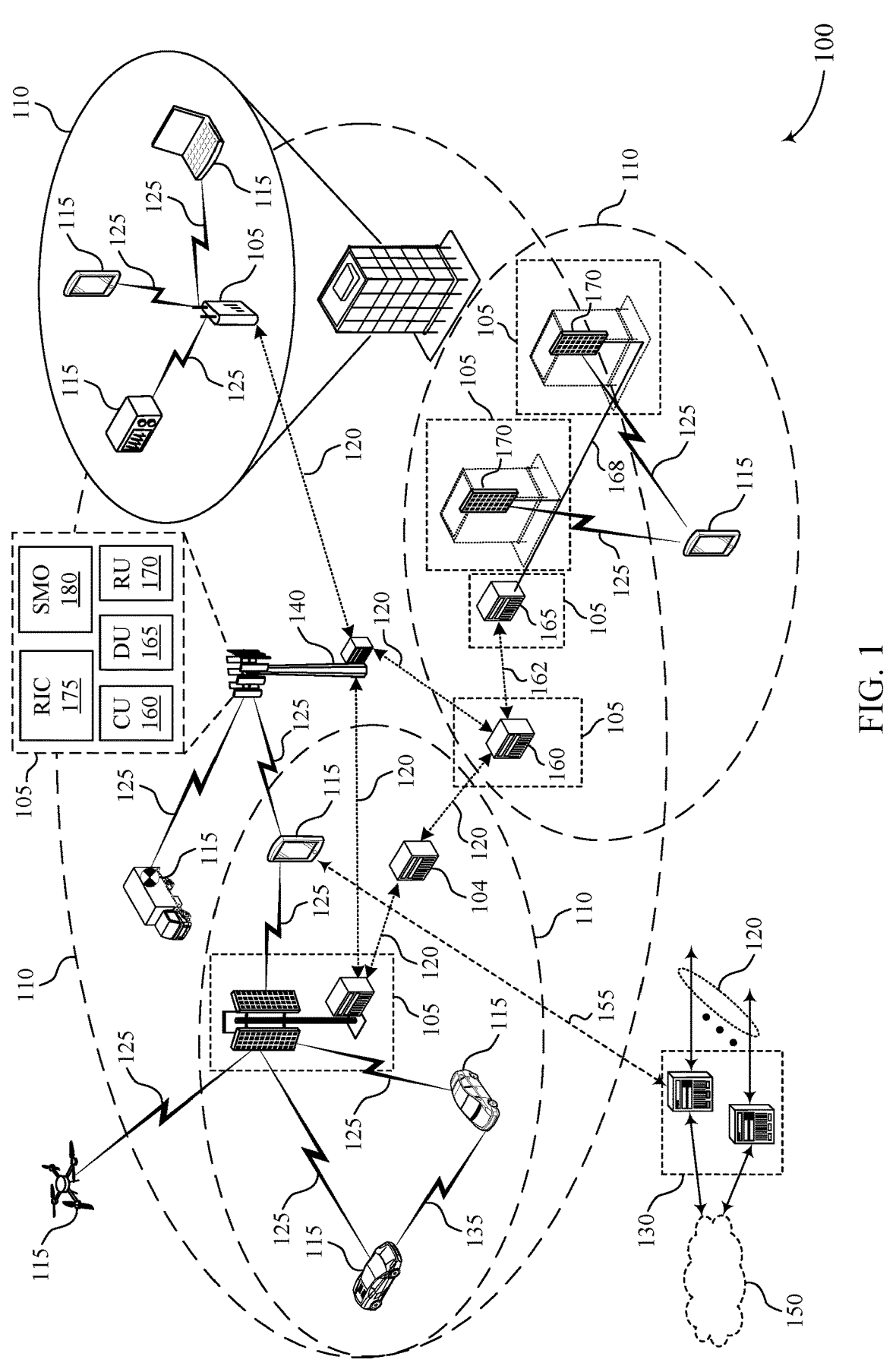
FIGS. 1, 2A, 2B, and 2C illustrate examples of a wireless communications system that supports inter-user equipment (UE) cross link interference (CLI) reduction in accordance with one or more aspects of the present disclosure.

In some wireless communications systems, a communication device, such as a user equipment (UE) or a network entity, may support wireless communications over one or multiple radio access technologies. Examples of radio access technologies may include fourth generation (4G) systems, such as Long-Term Evolution (LTE) systems, and fifth generation (5G) systems, which may be referred to as NR systems. In such cases, the communication device may operate in a half-duplex mode or a full-duplex mode, or a combination thereof. In a half-duplex mode, the communication device may either transmit communications or receive communications during a time period, such as a transmission time interval (TTI) that may span one or more time resources (e.g., symbols, mini-slots, slots, etc.). In a full-duplex mode, the communication device may simultaneously transmit and receive communications during the time period. That is, communications received by the communication device may overlap in the time domain with communications transmitted by the communication device.

In some examples, neighboring communication devices (e.g., UEs, network entities, or the like) may perform full-duplex communications or half-duplex time division duplexing (TDD) concurrently, such that communications transmitted by a first communication device, such as a first UE, may overlap in time with communications received by a second communication device, such as a second UE (e.g., a neighboring communication device). In such an example, the communications transmitted by the first UE may interfere with the communications received at the second UE. Such interference may be referred to as inter-UE cross-link interference (CLI) or other similar terminology. In some examples, CLI may degrade wireless communications between the second UE and the network. Accordingly, one or more communication devices may perform interference mitigation techniques to reduce CLI, however, conventional techniques may result in increased overhead and enhancements may be desired.

Accordingly, techniques described herein may support inter-UE CLI interference mitigation. For example, a first UE may receive sidelink signaling from one or more other UEs. In some cases, the sidelink signaling may include one or more discovery signals, one or more synchronization signal blocks (SSBs), or one or more sidelink control information (SCI) transmissions. Additionally, the first UE may generate measurement information associated with inter-UE CLI between the first UE and the one or more other UEs based on the sidelink signaling. For example, the measurement information may include a respective signal receive power for each respective UE of the one or more other UEs. Further, the first UE may transmit, to a network entity, an inter-UE CLI interference report that includes information indicative of a first set of one or more UEs from among the one or more other UEs, where each UE of the first set of one or more UEs may be associated with respective measurement information that satisfies a threshold. For example, the inter-UE CLI report may include a respective identifier for respective UE of the first set of one or more UEs, where the first set of one or more UEs are associated with respective signal receive powers that exceed the threshold. Additionally, or alternatively, the first set of one or more UEs may be associated with respective signal receive powers that are below the threshold. As such, the network entity may communicate with the first UE and the one or more other UEs based on the inter-UE CLI report.

Aspects of the disclosure are initially described in the context of wireless communications systems. Aspects of the disclosure are then described in the context of full-duplex operation schemes and a process flow. Aspects of the disclosure are further illustrated by and described with reference to apparatus diagrams, system diagrams, and flowcharts that relate to inter-user equipment cross-link interference reporting.

FIG. 1 illustrates an example of a wireless communications system 100 that supports inter-UE CLI reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity 105, or a wireless node) may include, be, or be included in (e.g., be a component of) a base station (e.g., any base station described herein), a UE 115 (e.g., any UE described herein), a network controller, an apparatus, a device, a computing system, an integrated access and backhauling (IAB) node, a distributed unit (DU) 165, a central unit (CU) 160, a remote/radio unit (RU) 170 (which may also be referred to as a remote radio unit (RRU)), and/or another processing entity configured to perform any of the techniques described herein. For example, a network node may be a UE 115. As another example, a network node may be a base station or network entity 105. As another example, a first network node may be configured to communicate with a second network node or a third network node. In one aspect of this example, the first network node may be a UE 115, the second network node may be a base station, and the third network node may be a UE 115. In another aspect of this example, the first network node may be a UE 115, the second network node may be a base station, and the third network node may be a base station. In yet other aspects of this example, the first, second, and third network nodes may be different relative to these examples. Similarly, reference to a UE 115, base station, apparatus, device, computing system, or the like may include disclosure of the UE 115, base station, apparatus, device, computing system, or the like being a network node. For example, disclosure that a UE 115 is configured to receive information from a base station also discloses that a first network node is configured to receive information from a second network node. Consistent with this disclosure, once a specific example is broadened in accordance with this disclosure (e.g., a UE 115 is configured to receive information from a base station also discloses that a first network node is configured to receive information from a second network node), the broader example of the narrower example may be interpreted in the reverse, but in a broad open-ended way. In the example above where a UE 115 is configured to receive information from a base station also discloses that a first network node is configured to receive information from a second network node, the first network node may refer to a first UE 115, a first base station, a first apparatus, a first device, a first computing system, a first set of one or more one or more components, a first processing entity, or the like configured to receive the information; and the second network node may refer to a second UE 115, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support inter-UE CLI reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers. Communication between a network entity 105 and other devices may refer to communication between the devices and any portion (e.g., entity, sub-entity)

of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support inter-UE CLI interference mitigation. For example, a first UE 115 may receive sidelink signaling from one or more other UEs 115. In some cases, the sidelink signaling may include one or more discovery signals, one or more SSBs, or one or more SCI transmissions. Additionally, the first UE 115 may generate measurement information associated with inter-UE CLI between the first UE 115 and the one or more other UEs 115 based on the sidelink signaling. That is, the sidelink signaling may be associated with (e.g., include) one or more measurable resources (e.g., resource blocks (RBs) or resource elements (REs)) such that the first UE 115 may measure the measurable resources to generate the measurement information. For example, the first UE 115 may measure the sidelink signal from each respective UE 115 of the one or more other UEs to generate a respective signal receive power (e.g., reference signal receive power (RSRP)) for each respective UE 115 of the one or more other UEs 115. Further, the first UE 115 may transmit, to a network entity 105, an inter-UE CLI interference report that includes information indicative of a first set of one or more UEs 115 from among the one or more other UEs 115, where each UE 115 of the first set of one or more UEs 115 may be associated with respective measurement information that satisfies a threshold. For example, the inter-UE CLI report may include a respective identifier for respective UE 115 of the first set of one or more UEs 115, where the first set of one or more UEs 115 are associated with respective signal receive powers that exceed the threshold. Additionally, or alternatively, the first set of one or more UEs 115 may be associated with respective signal receive powers that are below the threshold. As such, the network entity 105 may perform interference mitigation based on the inter-UE CLI report and may communicate with the first UE 115 and the one or more other UEs 115 based on the interference mitigation.

Figure 2A:
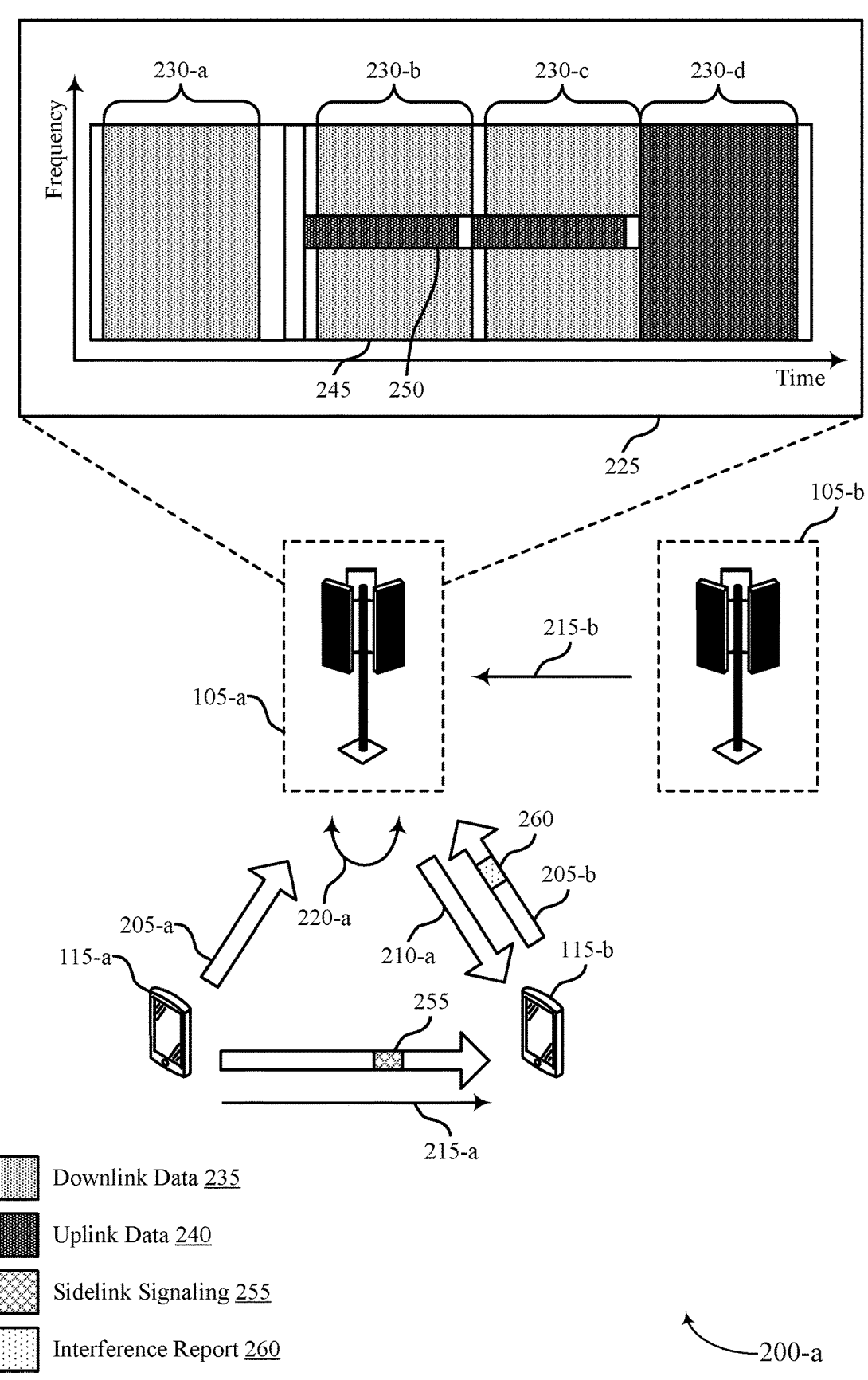
Figures 2B, 2C:
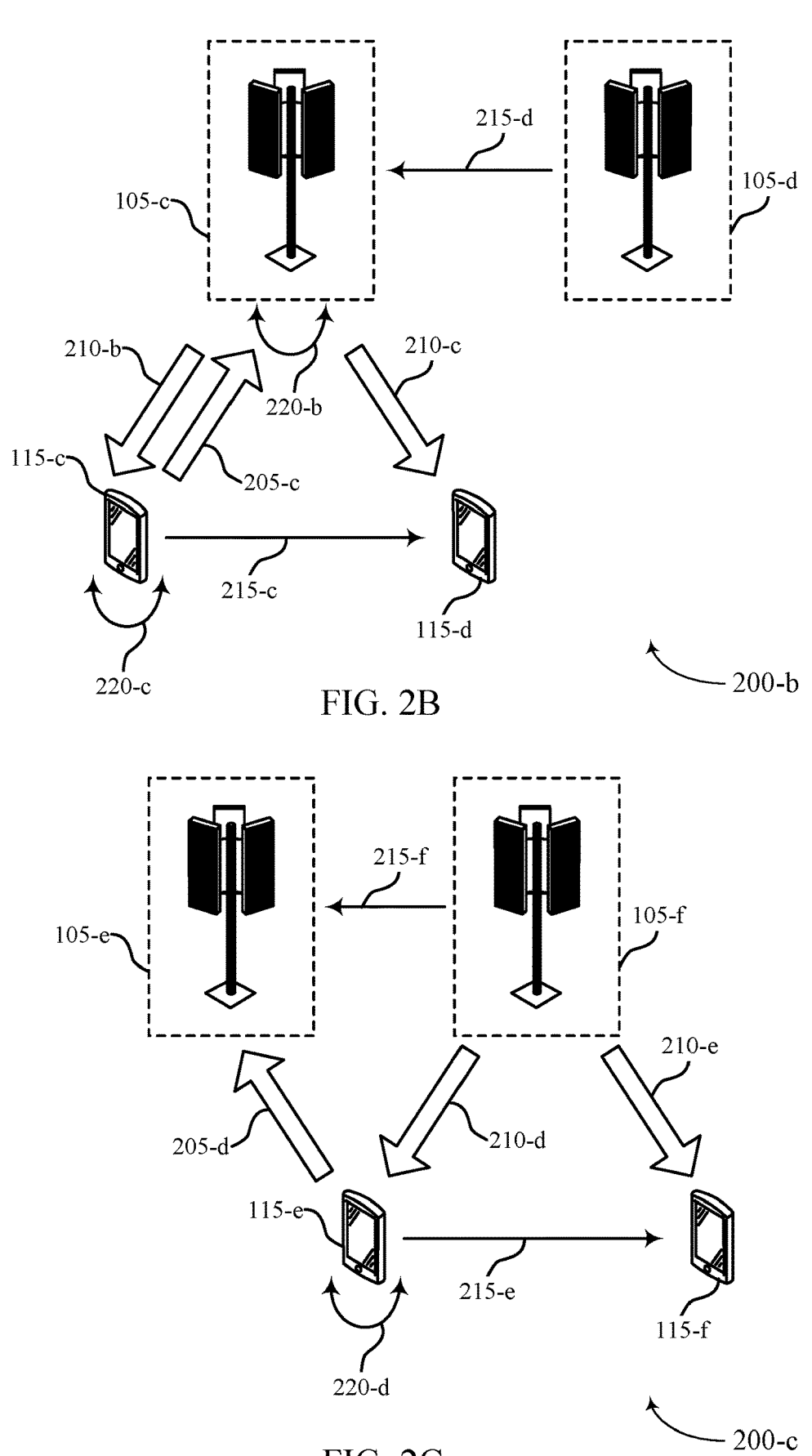

FIGS. 2A, 2B, and 2C each illustrate an example of a wireless communications system 200 that that supports inter-UE CLI reporting in accordance with one or more aspects of the present disclosure. In some examples, the wireless communications systems 200 (e.g., a wireless communications system 200-a, a wireless communications system 200-b, and a wireless communications system 200-c) may implement aspects of the wireless communications system 100. For example, the wireless communications systems 200 may each include one or more network entities 105 (e.g., a network entity 105-a, a network entity 105-b, a network entity 105-c, a network entity 105-d, a network entity 105-e, and a network entity 105-f) and one or more UEs 215 (e.g., a UE 115-a, a UE 115-b, a UE 115-c, a UE 115-d, a UE 115-e, and a UE 115-f), which may be examples of the corresponding devices as described with reference to FIG. 1. In the example of FIGS. 2A, 2B, and 2C, the network entities 105 may be examples of a CU 160, a DU 165, an RU 170, a base station 140, an IAB node 104, or one or more other network nodes as described with reference to FIG. 1. The wireless communications systems 200 may include features for improved communications between the UEs 115 and the network, among other benefits.

In the examples of FIGS. 2A, 2B, and 2C, the UEs 115 and the network entities 105 may communicate via one or more communication links 210 (e.g., a communication link 205-a, a communication link 205-b, a communication link 205-c, and a communication link 205-d) and via one or more communication links 210 (e.g., a communication link 210-a, a communication link 210-b, a communication link 210-c, a communication link 210-d, and a communication link 210-e). The communication links 205 may be examples of uplinks and the communication links 210 may be examples of downlinks. Additionally, or alternatively, the communication links 205 and the communication links 210 may each be examples of a communication link 125 as described with reference to FIG. 1. Each wireless communications system 200 may illustrate communication devices (e.g., one or more UEs 115, one or more network entities 105) operating in a full-duplex mode (e.g., performing full-duplex wireless communications) or a half-duplex TDD mode (e.g., performing half-duplex TDD wireless communications). That is, full-duplex (or half-duplex TDD) capabilities may be present at one or more network entities 105, one or more UEs 115 (or both). For example, the wireless communications systems 200 may support TDD radio frequency bands (e.g., radio frequency spectrum bands configured for TDD communications), FDD radio frequency bands (e.g., radio frequency spectrum bands configured for FDD communications), full-duplex communications at one or more network entities 105 (and/or one or more UEs 115), half-duplex communications at one or more UE 115, or any combination thereof.

Each wireless communications system 200 may support multiple types of full-duplex operations. For example, a communication device operating within the wireless communications systems 200 (e.g., a network entity 105, a UE 115) may support in-band full-duplex (IBFD) operations, sub-band FDD (SBFD) operations (e.g., frequency duplex operations), or both. In some examples of IBFD operations, the communication device may transmit and receive wireless communications on a same time and frequency resource (e.g., a same slot and component carrier bandwidth). For example, downlink communications and uplink communications may share time and frequency resources (e.g., IBFD time and frequency resources). In some examples, the time and frequency resources may partially overlap or fully overlap. Additionally, or alternatively, for SBFD operations, the communications device may transmit and receive communications at over a same time resource and one or more different frequency resources. That is, the downlink resources may be separated from the uplink resource in the frequency domain.

In the example of FIG. 2A, the network entity 105-a may support SBFD operations, such that downlink communications transmitted by the network entity 105-a (e.g., to the UE 115-b) may overlap in time with uplink communications received by the network entity 105-a (e.g., from the UE 115-a). In some examples, the network entity 105-a may configure communications for the UE 115-a and the UE 115-b according to the resource structure 225. The resource structure 225 may include time domain resources (e.g., slots, symbols) allocated for downlink data 235 (e.g., a time domain resource 230-a), time domain resources allocated for uplink data 240 (e.g., a time domain resource 230-d), and one or more time domain resources allocated for both downlink data 235 and uplink data 240 (e.g., a time domain resource 230-b and a time domain resource 230-c).

In some examples, the time domain resources allocated for both downlink data 235 and uplink data 240 (e.g., the time domain resource 230-b and the time domain resource 230-c) may be referred to as D+U slots (or D+U symbols). In some examples, a D+U slot may include half-duplex symbols (e.g., downlink symbols or uplink symbols) or full-duplex symbols (e.g., both downlink symbols and uplink symbols). For example, the time domain resource 230-b and the time domain resource 230-c (e.g., D+U slots) may be examples of slots, in which a radio frequency band is used for both transmitting uplink communications (e.g., uplink transmissions) and transmitting downlink communications (e.g., downlink transmissions). In some examples, the uplink transmissions and the downlink transmissions may occur in overlapping bands (e.g., for IBFD operations) or adjacent bands (e.g., for SBFD operations).

For SBFD operations in which uplink transmissions and downlink transmissions occur in adjacent bands, a half-duplex communication device may either transmit in an uplink radio frequency band or receive in a downlink radio frequency band. That is, for a given time domain resource (e.g., for a given D+U slot or a given D+U symbol), such as the time domain resource 230-b, the half-duplex device (e.g., the UE 115-a, the UE 115-b) may transmit uplink data 240 (e.g., perform a PUSCH transmission) in the uplink radio frequency band 250 or receive downlink data 235 the downlink radio frequency band 245. For example, the UE 115-a may transmit uplink data 240 in the uplink radio frequency band 250, while the UE 115-b receives downlink data 235 the downlink radio frequency band 245.

Additionally, or alternatively, for SBFD operations in which uplink and downlink transmissions occur in adjacent bands, a full-duplex device may transmit in the uplink radio frequency band and receive in the downlink radio frequency band. That is, for a given time domain resource (e.g., for a given D+U slot or a given D+U symbol), such as the time domain resource 230-*b*, the full-duplex device may transmit uplink data 240 (e.g., perform a PUSCH transmission) in the uplink radio frequency band 250 and receive downlink data 235 the downlink radio frequency band 245. In the example of FIG. 2B, the UE 115-*c* (e.g., a full-duplex device) may transmit communications in an uplink radio frequency band, while receiving communications in a downlink radio frequency band (e.g., over a same D+U slot or a same D+U symbol).

In some examples, full-duplex communications may provide for latency reduction. For example, latency savings may be enabled by receiving downlink signal in uplink slots. Moreover, full-duplex communications may provide for spectrum efficiency enhancement (e.g., per cell or per UE), efficient resource utilization, and coverage extension, among other benefits. In some examples, however, full-duplex communications may lead to one or more types of interference, such as inter-cell interference (e.g., from neighboring communication devices), self-interference (e.g., for full-duplex communication devices), and CLI (e.g., inter-cell CLI or intra-cell CLI). For example, a communication device (e.g., one or more network entities 105, one or more UEs 115) may experience self-interference 220 (e.g., a self-interference 220-*a*, a self-interference 220-*b*, a self-interference 220-*c*, and a self-interference 220-*d*) between a pair of beams, such as a beam used for transmitting communications and a beam used die receiving communications. In some examples, self-interference may result from signal leakage between an antenna panel used to transmit communications and an antenna panel used to receive communications.

Additionally, or alternatively, neighboring communication devices (e.g., neighboring UEs 115, neighboring network entities 105) may perform full-duplex communications (or half-duplex TDD) concurrently, such that communications received by a first communication device may overlap in time with communications transmitted by a second communication device (e.g., a neighboring communication device). In such an example, the communications transmitted by the second communication device may interfere with the communications received at the first communication device. For example, the communications transmitted by the second communication device may lead to CLI at the first communications device. In some examples, CLI (e.g., CLI 215-*a*, CLI 215-*b*, CLI 215-*c*, CLI 215-*d*, CLI 215-*e*, or CLI 215-*f*) may result from energy leakage due to timing and frequency unalignment (e.g., misalignment) between the neighboring communication devices.

Additionally or alternatively CLI may result from automatic gain control (AGC) mismatch (e.g., misalignment). For example, as illustrated in the example of FIG. 2A, the AGC of the UE 115-*b* may be driven (e.g., controlled) by downlink communications from a serving cell (e.g., the network entity 105-*a*). In such an example, uplink communications transmitted from the UE 115-*a* may saturate the AGC of the UE 115-*b*, resulting in a misalignment (e.g., a loss of orthogonality) of the downlink communications received by the UE 115-*b* and the uplink communications transmitted by the UE 115-*a*. In some examples, the misalignment of the downlink communications and the uplink communications may lead to CLI 215-*a* at the UE 115-*b*.

In some examples, the network entity 105-*a* may be operating in a full-duplex mode (e.g., SBFD or IBFD) and the UEs 115 (e.g., the UE 115-*a* and the UE 115-*b*) may be operating in a half-duplex mode. For example, the network entity 105-*a* may receive uplink communications from the UE 115-*a* (e.g., via the communication link 205-*a*), while simultaneously transmitting downlink communications to a UE 115-*b* (e.g., via the communication link 210-*a*). In such an example, the full-duplex communications at the network entity 105-*a* may lead to self-interference 220-*a*. Additionally, or alternatively, the network entity 105-*a* and the network entity 105-*b* (e.g., neighboring network entities) may concurrently perform full-duplex communications, such that downlink signals transmitted by the network entity 105-*b* may overlap with uplink signals received by the network entity 105-*a*, leading to CLI 215-*b*.

Additionally, or alternatively, the UE 115-*a* and the UE 115-*b* (e.g., neighboring UEs) may concurrently perform half-duplex TDD communications such that uplink signals transmitted by the UE 115-*b* may overlap with downlink signals received by the UE 115-*a*, which may lead to CLI 215-*a*. In some examples, the UE 115-*a* may be operating in a cell different from the cell in which the UE 115-*b* may be operating. For example, the UE 115-*a* and the UE 115-*b* may be operating in adjacent cells. In an example, the CLI 215-*a* may be an example of inter-cell CLI. Additionally, or alternatively, the network entity 105-*b* may perform full-duplex communications concurrently with the network entity 105-*a*. In such an example, downlink communications transmitted by the network entity 105-*b* may lead to inter-cell interference at the UE 115-*b*. For example, the downlink communications transmitted by the network entity 105-*b* (e.g., to another UE (not shown)) may interfere with downlink communications received the UE 115-*b* (e.g., from the network entity 105-*a*).

In some other examples, the UE 115-*a* and the UE 115-*b* may be operating in a same cell. In such an example, the CLI 215-*a* may be an example of intra-cell CLI. For example, the network entity 105-*a* may be operating in a full-duplex mode (e.g., in SBFD), such that the network entity 105-*a* may configure downlink communications for the UE 115-*a* in frequency domain resources adjacent to the frequency domain resources allocated for uplink communications from the UE 115-*b*. For example, the network entity 105-*a* may configure the UE 115-*b* to receive downlink data 235 (e.g., from the network entity 105-*a*) in the time domain resource 230-*b* and in the downlink radio frequency band 245 and the UE 115-*a* may be configured to transmit uplink data 240 in the time domain resource 230-*b* in the uplink radio frequency band 250 (e.g., the adjacent frequency resources). In such an example, the uplink communications transmitted by the UE 115-*a* may interfere with the downlink communications received at the UE 115-*b*.

In the example of FIG. 2B, the network entity 105-*c* and the UE 115-*c* may each be operating in a full-duplex mode (e.g., MDF), such that the UE 115-*c* may receive downlink communications from the network entity 105-*c* via the communication link 210-*b*, while simultaneously transmitting uplink communications to the network entity 105-*c* via the communication link 205-*c*. In such an example, the full-duplex communications at the network entity 105-*c* and the full-duplex communications at the UE 115-*c* may lead to self-interference 220-*b* and self-interference 220-*c*, respectively. In some examples of the wireless communications system 200-*b*, the UE 115-*c* and the UE 115-*d* may each be operating in a multiple transmission and reception mode. In such an example, downlink communications and uplink communications performed by the network entity 105-*c* may occur at two different antenna panels located at two transmission and reception points. For example, the reception of uplink communications from the UE 115-c a may occur at an antenna panel of a first transmission and reception point and the transmission of downlink communications to the UE 115-c may occur at an antenna panel of a second transmission and reception point. In some other examples, reception of the uplink communications and transmission of the downlink communications may occur at two co-located antenna panels of the network entity 105-c (e.g., a single base station).

In the example of FIG. 2C, the UE 115-e may be operating in a full-duplex mode (e.g., SBFD), such that the UE 115-e may receive downlink communications from the network entity 105-f via the communication link 210-d, while simultaneously transmitting uplink communications to the network entity 105-e via the communication link 205-d. In such an example, the full-duplex communications at the UE 115-e may lead to self-interference 220-d. In some examples of the wireless communications system 200-c, the network entity 105-e and the network entity 105-f may be examples of transmission and reception points and the UE 115-e (e.g., and the UE 115-f) may be operating in a multiple transmission and reception mode. In such an example, the uplink communications transmitted from the UE 115-e may lead to CLI 215-e (e.g., intra-cell CLI) at the UE 115-f.

Accordingly, the wireless communications systems 200 may support inter-UE CLI interference mitigation. For example, the UE 115-b may receive, from the UE 115-a sidelink signaling 255 (e.g., including one or more measurable resources) and may generate measurement information associated with interference, such as CLI 215-a, between the UE 115-a and the UE 115-b based on the sidelink signaling 255 (e.g., based on the one or more measurable resources). In some cases, the measurement information associated with the CLI 215-a between the UE 115-a and the UE 115-b may include signal receive power, such as an RSRP. Additionally, the UE 115-b may transmit, to the network entity 105-a, an interference report 260 (e.g., an inter-UE CLI report) that includes an identifier associated with the UE 115-a based on the measurement information associated with the CLI 215-a between the UE 115-a and the UE 115-b satisfying a threshold. In some cases, the UE 115-b may transmit the interference report 260 indicating the identifier associated with the UE 115-a based on the measurement information associated with the CLI 215-a between the UE 115-a and the UE 115-b exceeding the threshold. That is, the interference report 260 may indicate that communications transmitted by the UE 115-a may interfere with communications received by the UE 115-b. Alternatively, the UE 115-b may transmit the interference report 260 indicating the identifier associated with the UE 115-a based on the measurement information associated with the CLI 215-a between the UE 115-a and the UE 115-b failing to exceed the threshold. That is, the interference report 260 may indicate that communications transmitted by the UE 115-a may not interfere with communications received by the UE 115-b. As such, the network entity 105-a may perform interference mitigation based on the interference report 260 and may communicate with the UE 115-a and the UE 115-b based on the interference mitigation. For example, the network entity 105-a may schedule simultaneously downlink communications on the communication link 210-a and uplink communications on the communication link 205-a based on the interference report 260 indicating the identifier associated with the UE 115-a based on the measurement information associated with the CLI 215-a between the UE 115-a and the UE 115-b failing to exceed the threshold. Alternatively, the network entity 105-a ma refrain from scheduling simultaneously downlink communications on the communication link 210-a and uplink communications on the communication link 205-a based on the interference report 260 indicating the identifier associated with the UE 115-a based on the measurement information associated with the CLI 215-a between the UE 115-a and the UE 115-b exceeding the threshold.

FIGS. 3A and 3B each illustrate an example of a full-duplex operation scheme 300 that supports inter-UE CLI reporting in accordance with one or more aspects of the present disclosure. In some examples, the full-duplex operation schemes 300 (a full-duplex operation scheme 300-a and a full-duplex operation scheme 300-b) may implement or be implemented by aspects of the wireless communications system 100. For example, the full-duplex operation schemes 300 may each be implemented by a network entity 105 or a UE 115, which may be examples of the corresponding devices as described with reference to FIG. 1. In some examples of FIGS. 3A and 3B, the network entity 105 may be an example of a CU 160, a DU 165, an RU 170, a base station 140, an IAB node 104, or one or more other network nodes as described with reference to FIG. 1. The full-duplex operation schemes 300 may include features for improved communications between the UE 115 and the network entity 105, among other benefits.

In some examples, a wireless communications device (e.g., the network entity 105 or the UE 115) may support full-duplex communications, in which the communication device may transmit and receive communication simultaneously, thereby promoting latency savings enabled by receiving downlink signal in uplink slots (or symbols). In some examples, the communication device may support multiple (e.g., two) types of full-duplex operations. For example, the communication device may support SBFD operations, in which the communication device may transmit and receive communications over a same time resource and on different frequency resources. That is, the downlink resources may be separated from the uplink resource in the frequency domain.

For example, as illustrated by the example of FIG. 3A, the network entity 105 may configure one or more UEs 115 in accordance with the configuration 305-a. In such an example, the network entity 105 may configure downlink transmissions (e.g., transmissions of downlink data 310) for the UE 115 in frequency domain resources (e.g., a resource 315-a) that may be adjacent to frequency domain resources (e.g., a resource 315-b) configured for uplink transmission (e.g., transmissions of uplink data 320) of another UE. In some examples, to reduce interference between the uplink transmissions (e.g., scheduled for the resource 315-a) and the downlink transmissions (e.g., scheduled for the resource 315-b), the network entity 105 may configure the resource 315-a and the resource 315-b to be separated by a guard band 316.

Additionally, or alternatively, as illustrated in the example of FIG. 3B, the network entity 105 (e.g., the network entity 105 entity) may support IBFD operations, such that the network entity 105 entity may transmit and receive communications on a same time resource and a same frequency resource (e.g., a same slot and carrier bandwidth). For example, the network entity 105 may configure one or more UEs 115 in accordance with the configuration 305-b, the configuration 305-c, or both. In such an example, the network entity 105 may configure downlink transmissions (e.g., transmission of the downlink data 310) and the uplink transmissions (e.g., transmission of the uplink data 320), such that the downlink transmission and the uplink transmissions may share a same one or more time and frequency resources (e.g., IBFD time and frequency resources). In some examples, the network entity 105 may configure one or more UEs 115 in accordance with the configuration 305-*b*, such that one or more time and frequency resources allocated for transmission of the uplink data 320 (e.g., a resource 315-*c*) may overlap (e.g., fully overlap) with one or more time and frequency resources allocated for transmission of the downlink data 310 (e.g., a resource 315-*d*). Additionally, or alternatively, the network entity 105 may configure one or more UEs 115 in accordance with the configuration 305-*c*, such that a portion of the one or more time and frequency resources allocated for transmission of the uplink data 320 (e.g., a resource 315-*e*) may overlap with a portion of the one or more time and frequency resources allocated for transmission of the downlink data 310 (e.g., a resource 315-*f*). That is, the resource 315-*e*) may partially overlap with the resource 315-*f*.

In some examples, while full-duplex communications may provide for one or more spectrum efficiency enhancements (e.g., per cell or per UE 115), efficient resource utilization, and coverage area extension, concurrent full-duplex communications performed by neighboring communication devices may lead to CLI. For example, neighboring communication devices may perform full-duplex communications concurrently, such that communications received by a first communication device may overlap in time with communications transmitted by a second communication device (e.g., a neighboring communication device). In such an example, the communications transmitted by the second communication device may lead to CLI at the first communication device.

In some examples, to reduce the effects of CLI (e.g., inter-UE CLI), the network entity 105 may employ one or more interference mitigation techniques. For example, the first UE 115 may receive sidelink signaling, such as discovery signaling, SSBS, or SCI, from one or more second UEs 115. Additionally, the first UE 115 may generate respective measurement information associated with inter-UE CLI between the first UE 115 and each second UE 115 based on the respective sidelink signaling. For example, the first UE 115 may generate a respective signal receive power associated with each second UE 115. Further, the first UE 115 may transmit, to the network entity 105, an inter-UE CLI report indicating at least a first subset of the one or more second UEs 115, where measurement information associated with each second UE 115 of the first subset satisfies a threshold. In some cases, each second UE 115 of the first subset may be associated with respective measurement information that exceeds the threshold, which may indicate that transmissions communicated by each second UE 115 of the first subset may result in CLI at the first UE 115. Alternatively, each second UE 115 of the first subset may be associated with respective measurement information that fails to exceed the threshold, which may indicate that transmissions communicated by each second UE 115 of the subset may not result in CLI at the first UE 115. As such, the network entity 105 may perform interference mitigation based on the inter-UE CLI report and may communicate with the first UE 115 and the one or more second UEs 115 based on the interference mitigation.

Figure 4:
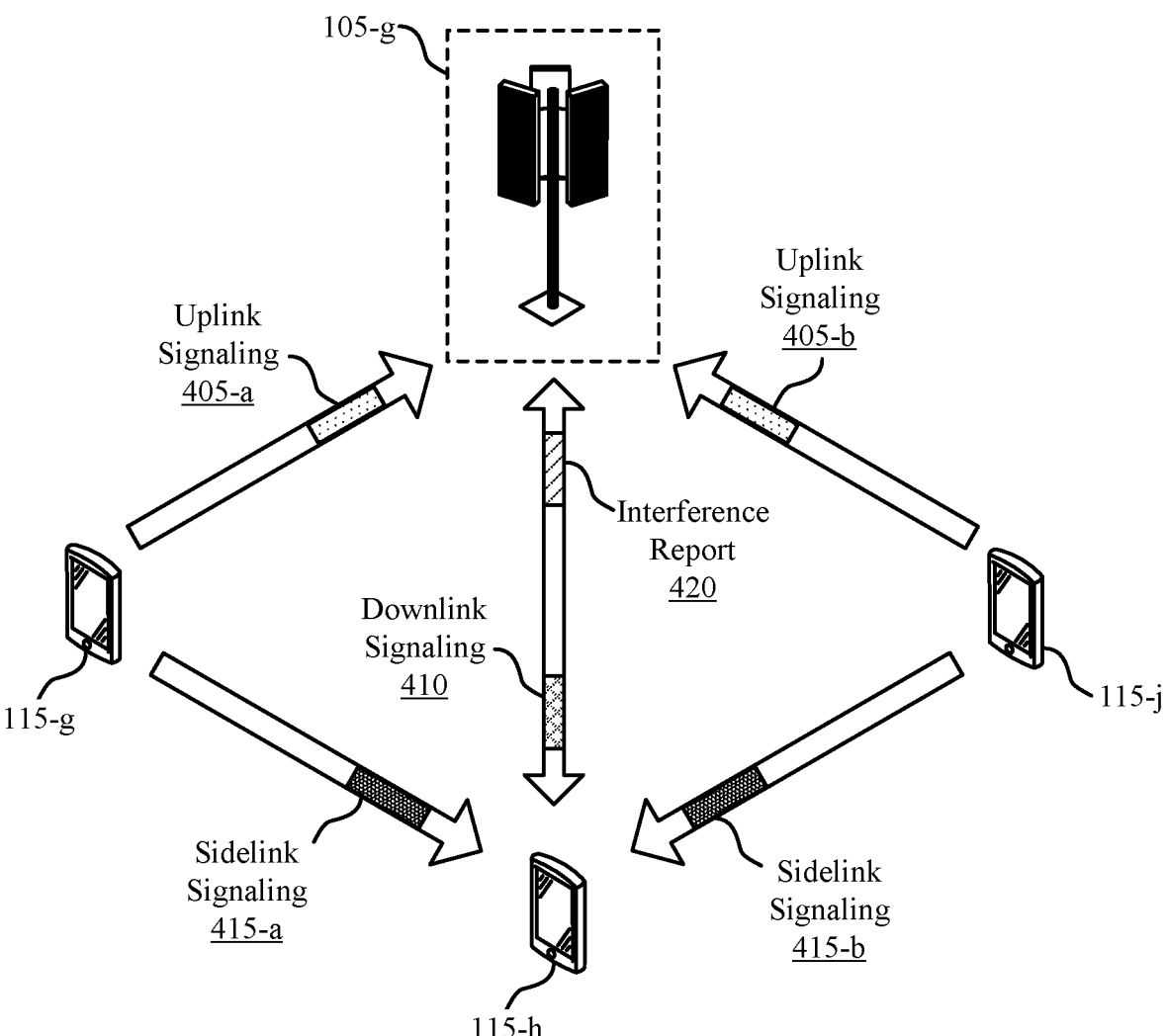
FIG. 4 illustrates an example of a wireless communications system that supports inter-UE CLI reporting in accordance with one or more aspects of the present disclosure.

FIG. 4 illustrates an example of a wireless communications system 400 that supports inter-UE CLI reporting in accordance with one or more aspects of the present disclosure. In some examples, the wireless communications system 400 may implement or be implemented by aspects of the wireless communications system 100, the wireless communications systems 200 and the full-duplex operation schemes 300. For example, the wireless communications system 400 may each include one or more network entities 105 (e.g., a network entity 105-*g*) and one or more UEs 115 (e.g., a UE 115-*g* and a UE 115-*h*), which may be examples of the corresponding devices as described with reference to FIG. 1. In the example of FIG. 4, the network entities 105 may be examples of a CU 160, a DU 165, an RU 170, a base station 140, an IAB node 104, or one or more other network nodes as described with reference to FIG. 1.

In some examples, the wireless communications system 200 may support full-duplex operations such that the network entity 105-*g* may simultaneously receive uplink signaling 405, such as uplink signaling 405-*a* from the UE 115-*g* or uplink signaling 405-*b* from the UE 115-*j*, and transmit downlink signaling 410 (e.g., to the UE 115-*h*). In such examples, the uplink signaling 405-*a*, the uplink signaling 405-*b*, or both, may cause interference (e.g., inter-UE CLI) with the downlink signaling 410 received by the UE 115-*h*.

As such, the wireless communications system 400 may support transmission of inter-UE CLI reports to enable beam identification for inter-UE CLI mitigation (e.g., for TDD and FD scenarios). For example, the UE 115-*h* may receive sidelink signaling 415-*a* from the UE 115-*g* and sidelink signaling 415-*b* from the UE 115-*j*. In some cases, the sidelink signaling 415 may be one or more discovery messages, one or more SSBs, one or more SCI transmissions, or any combination thereof. In some cases (e.g., Mode 1), the network entity 105-*g* may transmit, to the UE 115-*g*, the UE 115-*j*, or both, an indication of a configuration associated with the respective sidelink signaling 415-*a*. In some other cases (e.g., Mode 2), the UE 115-*g*, the UE 115-*h*, or both, may be pre-configured with the configuration associated with the respective sidelink signaling 415. Additionally, or alternatively, the configuration associated with the sidelink signaling 415-*a* may be synchronized with the sidelink signaling 415-*b* or may be time-division-multiplexed with the sidelink signaling 415-*b*.

Additionally, a beam used to transmit the sidelink signaling 415 may be based on a beam associated with the respective uplink signaling 405 (e.g., access link) or with the downlink signaling 410. For example, a first beam used to transit the sidelink signaling 415-*a* may be based on a second beam used to transmit the uplink signaling 405-*a*. Similarly, a third beam used to transit the sidelink signaling 415-*b* may be based on a fourth beam used to transmit the uplink signaling 405-*b*. In some examples (e.g., FR1 operations), the beam used to transmit the sidelink signaling 415 may be the same as the beam used to transmit the respective uplink signaling 405 (e.g., the beam associated with the respective uplink signaling 405 may be omni-directional or quasi-directional). For example, the first beam may be the same as the second beam and the third beam may be the same as the fourth beam. In some other examples (e.g., FR2), the beam used to transmit the sidelink signaling 415 may be quasi co-located (quasi-colocated) with the beam used to transmit the respective uplink signaling 405 (e.g., the sidelink signaling 415 is configured with the same quasi-colocated root beam or the same, or wider, beam as the beam used to transmit the respective uplink signaling 405). For example, the first beam may quasi-colocated with the second beam and the third beam may quasi-colocated with the fourth beam.

The UE 115-*h* may generate measurement information associated with inter-UE CLI between the UE 115-*h* and the UE 115-*g* based on the sidelink signaling 415-*a* and between the UE 115-*h* and the UE 115-*j* based on the sidelink signaling 415-*b*. That is, the UE 115-*h* may measure one or more measurable resources (e.g., REs or RBs) associated with the respective sidelink signaling 415 to generate a respective signal receive power (e.g., an RSRP) for each respective UE 115. For example, the UE 115-*h* may generate a first signal receive power for the UE 115-*g* based on the sidelink signaling 415-*a* (e.g., measurable resources in the sidelink signaling 415-*a*) and a second signal receive power for the UE 115-*j* based on the sidelink signaling 415-*b* (e.g., measurable resources in the sidelink signaling 415-*b*).

Further, the UE 115-*h* may transmit, to the network entity 105-*g*, an interference report 420 (e.g., an inter-UE CLI report) based on the measurement information. That is, the UE 115-*h* may transmit the interference report 420 that includes information indicative of the UE 115-*g*, the UE 115-*h*, or both (e.g., a first set of one or more UEs 115) based on measurement information associated with the UE 115-*g*, the UE 115-*h*, or both satisfying a threshold (e.g., CLI threshold). In some cases, the information indicative of the UE 115-*g*, the UE 115-*h*, or both, may include a respective identifier for each UE 115, such as a first identifier associated with the UE 115-*g*, a second identifier associated with the UE 115-*h*, or both.

In some examples, the UE 115-*h* may determine one or more UEs 115 for which respective measurement information, such as respective signal receive power, exceeds the threshold and may transmit the interference report 420 indicating the one or more UEs 115 for which respective measurement information exceeds the threshold. For example, the first signal receive power associated with the UE 115-*g* may exceed the threshold while the second signal receive power associated with the UE 115-*j* is below the threshold. As such, the UE 115-*h* may transmit the interference report 420 including the first identifier associated with the UE 115-*g* based on the first signal receive power exceeding the threshold.

In some examples, the UE 115-*h* may determine one or more UEs 115 for which respective measurement information, specifically respective signal receive power, is below the threshold and may transmit the interference report 420 indicating the one or more UEs 115 for which respective measurement information is below the threshold. For example, the first signal receive power associated with the UE 115-*g* may exceed the threshold while the second signal receive power associated with the UE 115-*j* is below the threshold. As such, the UE 115-*h* may transmit the interference report 420 including the second identifier associated with the UE 115-*g* based on the second signal receive power being below the threshold.

In some cases, the UE 115-*h* may indicate a quantity of UEs 115 in the interference report 420. That is, the UE 115-*g* may receive information indicative of a quantity of UEs 115 for the UE 115-*g* to indicate in the interference report 420. For example, the UE 115-*g* may receive information indicating for the UE 115-*g* to report a subset of UEs 115 from a set of UEs 115 associated with the five largest signal receive powers (e.g., that exceed the threshold) from signal receive powers associated with the set of UEs 115. In another example, the UE 115-*g* may receive information indicating for the UE 115-*g* to report the subset of UEs 115 from the set of UEs 115 associated with the five smallest signal receive powers (e.g., that are below the threshold) from signal receive powers associated with the set of UEs 115.

Additionally, or alternatively, the interference report 420 may include information indicative of a respective transmit beam associated with the respective measurement information corresponding to each of the indicated UEs 115 (e.g., each UE 115 of the first set of one or more UEs 115). For example, the interference report 420 may indicate the first beam associated with the UE 115-*h* (e.g., based on indicating the UE 115-*h*). In some examples, the UE 115-*g* may indicate the first beam to the UE 115-*h* via the sidelink signaling 415-*a*. That is, the sidelink signaling 415-*a* may indicate a beam identifier associated with the first beam (e.g., via a transmission configuration indicator (TCI) field). Alternatively, the UE 115-*h* may determine (e.g., identify) the first beam based on a reference signal (e.g., QCL source reference signal in Uu link).

Additionally, or alternatively, the interference report 420 may include information indicative of a respective receive beam associated with the respective measurement information corresponding to each of the indicated UEs 115 (e.g., each UE 115 of the first set of one or more UEs 115). For example, the UE 115-*h* may use a fifth beam to receive the sidelink signaling 415-*a* and the interference report 420 may indicate the fifth beam associated with reception of the sidelink signaling 415-*a* from the UE 115-*h* (e.g., based on indicating the UE 115-*h*). In some cases, the UE 115-*h* may determine (e.g., identify) the fifth beam based on a reference signal (e.g., QCL source reference signal in Uu link).

Additionally, or alternatively, the interference report 420 may include information indicative of respective time and frequency resources associated with the respective measurement information corresponding to each of the indicated UEs 115 (e.g., each UE 115 of the first set of one or more UEs 115). In some examples, the time and frequency resources may be associated with reception (e.g., detection) of respective sidelink signaling 415 (e.g., such that the network entity 105-*g* may be aware of one or more transmission parameters, such as transmit power, of the respective UE 115 transmitting the respective sidelink signaling 415).

Additionally, or alternatively, the interference report 420 may include information indicative of a respective pathloss between with between each of the indicated UEs 115 (e.g., each UE 115 of the first set of one or more UEs 115) and the UE 115-*h*.

Additionally, or alternatively, the interference report 420 may include information indicative of location information corresponding to the indicates UEs 115 (e.g., each UE 115 of the first set of one or more UEs 115). In some cases, the location information may be associated with a location zone of a respective UE 115 (e.g., a location zone may be defined as a rectangular zone around the earth surface, such as a 10 meter by 10 meter rectangular zone). For example, the UE 115-*g*, the UE 115-*j*, or both, may transmit respective location information to the UE 115-*h* (e.g., via the respective sidelink signal 415). In some cases, the interference report may exclude information indicative of UEs 115 being greater than a threshold distance away from the UE 115-*h*. For example, the UE 115-*h* may be configured to report UEs 115 associated with signal receive powers that exceed the threshold (e.g., CLI threshold), such as the UE 115-*g*. However, a location of the UE 115-*h* may be at a distance greater than the threshold distance from the UE 115-*h*, such that the UE 115-*h* may refrain from indicating the UE 115-*g* in the interference report 420. Conversely, the UE 115-*h* may report UEs 115 being within the threshold distance away from the UE 115-*h* (e.g., being associated with location zones within the threshold distance away from the UE 115-*h*).

In some examples, the interference report 420 may indicate whether each indicated UE 115 (e.g., each UE 115 of the first set of one or more UEs 115) is within the coverage area of a network associated with the network entity 105-g. For example, the interference report 420 may include information indicative of a network cell identifier associated with each indicated UE 115 within the coverage area of the network. In some examples, each sidelink UE 115, such as the UE 115-g and the UE 115-j, may transmit an indication of a respective network cell identifier in the respective sidelink signaling 415. In such case, the network entity 105-g may coordinate with one or more additional network entities 105 based on the interference report 420. For example, the interference report 420 may indicate the transmissions by the UE 115-g cause inter-UE CLI at the UE 115-h, where the UE 115-g is within the coverage area of the network associated with the network entity 105-g and communicating with another network entity 105. As such, the network entity 105-g may perform interference mitigation by coordinating with the other network entity 105.

Alternatively, the interference report 420 may include information indicative of an invalid (e.g., reserved) cell identifier or no cell identifier associated with each indicated UE 115 outside the coverage area of the network. In such cases, the network entity 105-g may perform interference mitigation by communicating with each indicated UE 115 outside the coverage area of the network via a relay communication link. Additionally, or alternatively, the network entity 105-g may transmit, to the UE 115-h, signaling indicating for the UE 115-h to refrain from reporting UE 115 outside the coverage area of the network, regardless of the associated measurement information (e.g., the network entity 105-g may be unable to perform interference mitigation by communicating with each UE 115 outside the coverage area of the network).

While some examples herein are described in the context of CLI between a first UE 115 (e.g., the UE 115-h) and one or more other UEs 115 (e.g., the UE 115-g and the UE 115-j), this is not to be regarded as a limitation of the present disclosure. Rather, the techniques described herein may be implemented by network nodes of any one or more types. For example, CLI may be related signaling or interference between network nodes of a first type (e.g., UEs 115 being one example of network nodes of a first type) and the CLI interference report may be transmitted by a network node of the first type to a network node of a second type (e.g., a network entity 105 being one example of a network node of a second type).

Figure 5:
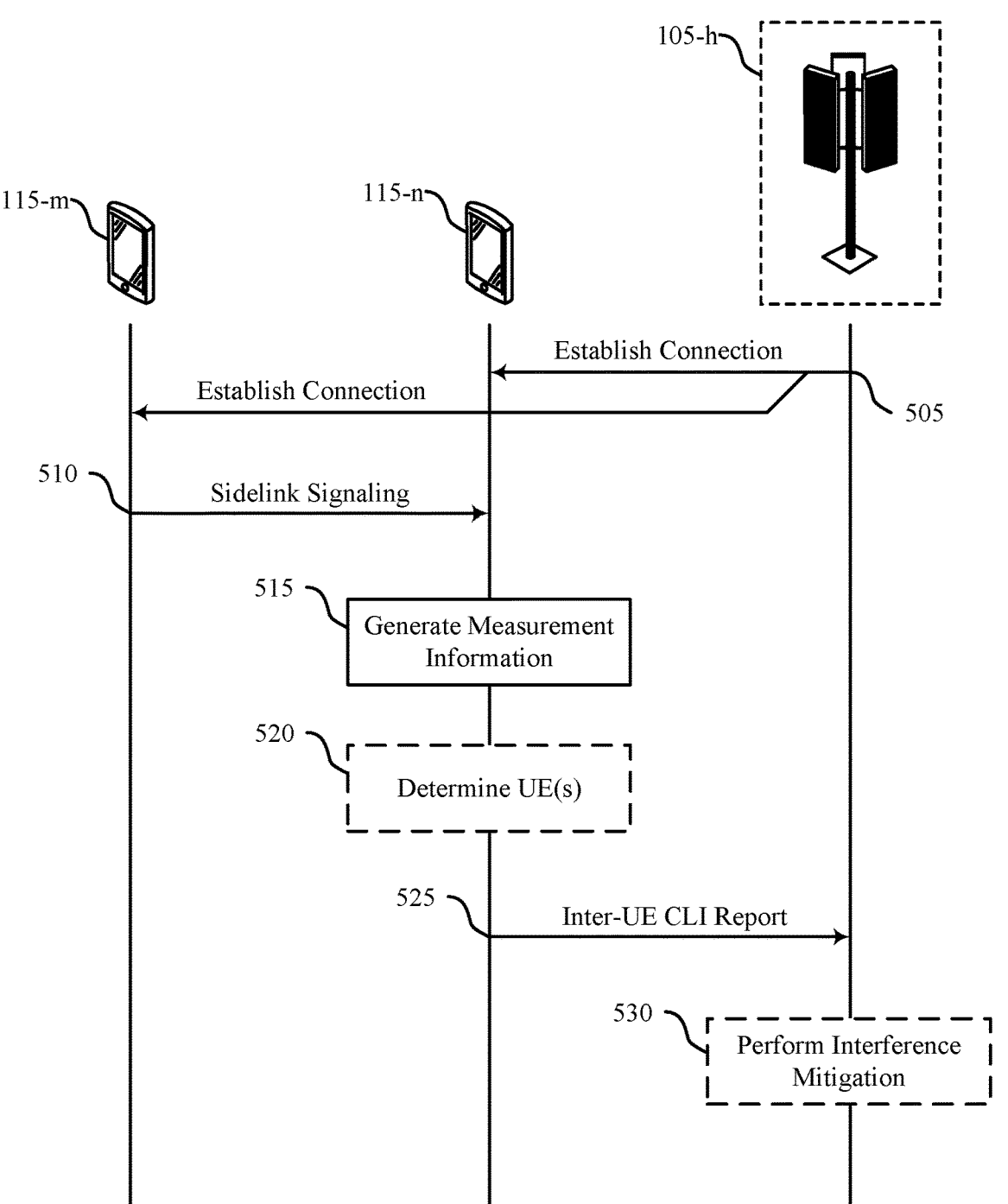
FIG. 5 illustrates an example of a process flow that supports inter-UE CLI reporting in accordance with one or more aspects of the present disclosure.

FIG. 5 illustrates an example of a process flow 500 that supports inter-UE CLI reporting in accordance with one or more aspects of the present disclosure. In some examples, the process flow 500 may implement or be implemented by aspects of the wireless communications system 100, the wireless communications systems 200, the full-duplex operation schemes 300, and the wireless communications system 400. For example, the process flow 500 may each include one or more network entities 105 (e.g., a network entity 105-h) and one or more UEs 115 (e.g., a UE 115-m and a UE 115-n), which may be examples of the corresponding devices as described with reference to FIG. 1. In the example of FIG. 5, the network entities 105 may be examples of a CU 160, a DU 165, an RU 170, a base station 140, an IAB node 104, or one or more other network nodes as described with reference to FIG. 1. In some examples, the UE 115-m may transmit an inter-UE CLI report to the network entity 105-h.

At 505, the network entity 105-h may establish respective connections with the UE 115-m and the UE 115-n.

At 510, the UE 115-n may receive sidelink signaling from one or more other UEs 115, including at least the UE 115-m. The sidelink signaling may include one or more discovery signals, one or more SSBs, or one or more SCIs.

In some examples, the sidelink signaling from the one or more other UEs 115 may be associated with one or more beams that are also associated with uplink or downlink communication between the network entity 105-h and the one or more other UEs 115. For example, the sidelink signaling from the UE 115-m may be associated with one or more beams that are also associated with uplink communications between the network entity 105-h and the UE 115-m. Additionally, or alternatively, the sidelink signaling from the one or more other UEs 115 may be associated with one or more first beams that are quasi-colocated with one or more second beams associated with uplink or downlink communication between the network entity 105-h and the one or more other UEs 115.

At 515, the UE 115-n may generate measurement information associated with inter-UE CLI between the UE 115-n and the one or more other UEs 115 based on the sidelink signaling. For example, the UE 115-n may generate first measurement information associated with inter-UE CLI between the UE 115-n and the UE 115-m. In some examples, the measurement information may include a respective signal receive power for each respective UE 115 of the one or more other UEs 115. For example, the first measurement information may include a first signal receive power associated with the UE 115-m.

In some examples, at 520, the UE 115-m may determine, from among the one or more other UEs 115, one or more UEs 115 for which the respective signal receive power exceeds a threshold. Alternatively, the UE 115-m may determine, from among the one or more other UEs 115, one or more UEs 115 for which the respective signal receive power is below the threshold.

In some examples, the UE 115-n may receive information indicative of a quantity of UEs 115 for the UE 115-n to indicate in the inter-UE CLI report via the information indicative of the first set of one or more UEs 115. As such, the UE 115-m may determine, from among the one or more other UEs 115, a subset of one or more UEs 115 including the quantity of UEs 115. In some examples, the subset of the one or more UEs 115 is associated with respective measurement information greater than a corresponding measurement information value for each UE 115 of the one or more other UEs 115 not in the subset, wherein the threshold comprise a lowest respective measurement information value associated with the subset of one or more UEs 115, or less than a corresponding measurement information value for each UE 115 of the one or more other UEs 115 not in the subset, wherein the threshold comprise a highest respective measurement information value associated with the subset of one or more UEs 115.

At 525, the UE 115-n may transmit, to the network entity 105-h, an inter-UE CLI report that includes information indicative of a first set of one or more UEs 115 from among the one or more other UEs 115, where each UE 115 of the first set of one or more UEs 115 is associated with respective measurement information of the measurement information that satisfies the threshold (e.g., exceeds or is below). For example, the inter-UE CLI report may include information indicative of at least the UE 115-m based on the first measurement information satisfying the threshold. In some examples, the information indicative of the first set of one or more UEs includes a respective identifier for each respective UE of the first set of one or more UEs.

In some examples, the inter-UE CLI report may include information indicative of a respective transmit beam associated with the respective measurement information corresponding to each respective UE 115 of the first set of one or more UEs 115. Additionally, or alternatively, inter-UE CLI report may include information indicative of a respective receive beam associated with the respective measurement information corresponding to each respective UE 115 of the first set of one or more UEs 115. Additionally, or alternatively, inter-UE CLI report may include information indicative of respective time and frequency resources associated with the respective measurement information corresponding to each respective UE 115 of the first set of one or more UEs 115. Additionally, or alternatively, inter-UE CLI report may include information indicative of a respective pathloss between each respective UE 115 of the first set of one or more UEs 115 and the UE 115-$n$.

In some examples, the inter-UE CLI report may include first information indicative of whether each respective UE 115 of the first set of one or more UEs 115 is within a coverage area of a network that comprises the network entity 105-$h$. For example, the first information may be indicative of a network cell identifier associated with the respective UE 115 for each respective UE 115 of the first set of one or more UEs 115 that is within the coverage area of the network. Additionally, or alternatively, the first information is indicative of a respective invalid cell identifier or no cell identifier for each respective UE 115 of the first set of one or more UEs 115 that is outside the coverage area of the network. In some examples, the inter-UE CLI report may exclude information indicative of a second set of one or more UEs 115 from the one or more other UEs 115 based on each respective UE 115 of the second set of one or more UEs 115 being outside a coverage area of a network that comprises the network entity 105-$h$.

In some examples, a particular UE 115 from among the one or more other UEs 115 may be associated with respective measurement information that satisfies the threshold, and the inter-UE CLI report may exclude information indicative of the particular UE 115 based on the particular UE 115 being outside a coverage area of a network that comprises the network entity 105-$h$.

In some examples, the inter-UE CLI report may include information indicative of respective location information corresponding to each respective UE 115 of the first set of one or more UEs 115. That is, the UE 115-$n$ may receive second information indicative of respective location information corresponding to each of the one or more other UEs 115. In some examples, the inter-UE CLI report may exclude information indicative of a second set of one or more UEs 115 from the one or more other UEs 115 based on each respective UE 115 of the second set of one or more UEs 115 being greater than a threshold distance away from the UE 115 115-$n$. Alternatively, each respective UE 115 of the first set of one or more UEs 115 may be within the threshold distance of the UE 115-$n$, and the inter-UE CLI report may include the information indicative of the first set of one or more UEs 115 based on each respective UE 115 of the first set of one or more UEs 115 being within the threshold distance.

For example, the UE 115-$n$ may receive second information indicating location information corresponding to the UE 115-$m$.

In some examples, at 530, the network entity 105-$h$ may perform interference mitigation based on the inter-UE CLI and may communicate with the UE 115-$m$ and the UE 115-$n$ based on the interference mitigation.

Figure 6:
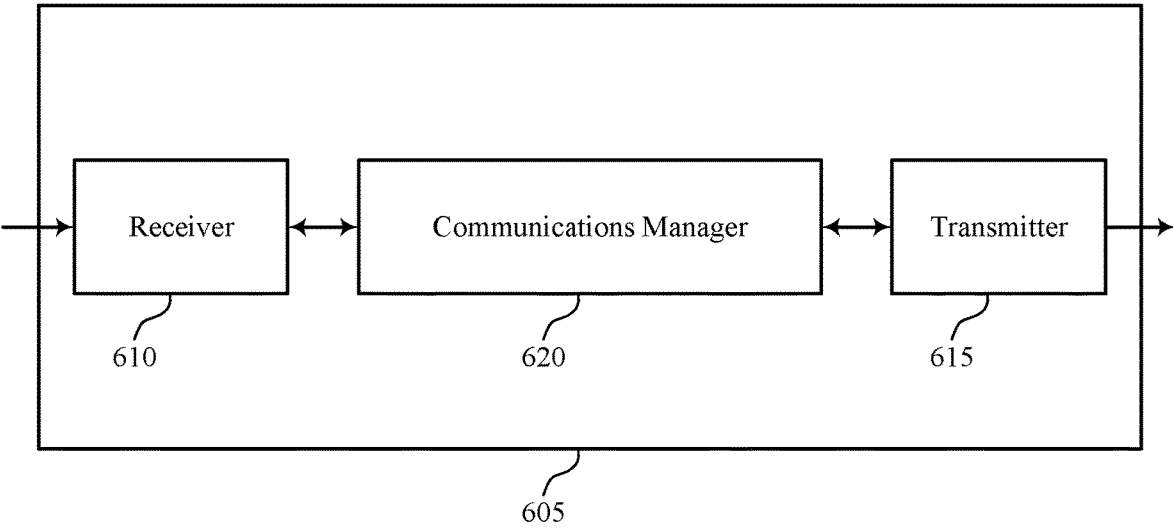
FIGS. 6 and 7 show block diagrams of devices that supports inter-UE CLI reporting in accordance with one or more aspects of the present disclosure.

FIG. 6 shows a block diagram 600 of a device 605 that supports inter-UE CLI reporting in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to inter-UE CLI reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to inter-UE CLI reporting). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of inter-UE CLI reporting as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. For example, the communications manager 620 may be configured as or otherwise support a means for receiving sidelink signaling from one or more other UEs. The communications manager 620 may be configured as or otherwise support a means for generating measurement information associated with inter-UE CLI between the first UE and the one or more other UEs based on the sidelink signaling. The communications manager 620 may be configured as or otherwise support a means for transmitting, to a network entity, an inter-UE CLI report that includes information indicative of a first set of one or more UEs from among the one or more other UEs, where each UE of the first set of one or more UEs is associated with respective measurement information of the measurement information that satisfies a threshold.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for inter-UE CLI mitigation which may result in reduced processing, reduced power consumption, and more efficient utilization of communication resources, among other advantages.

Figure 7:
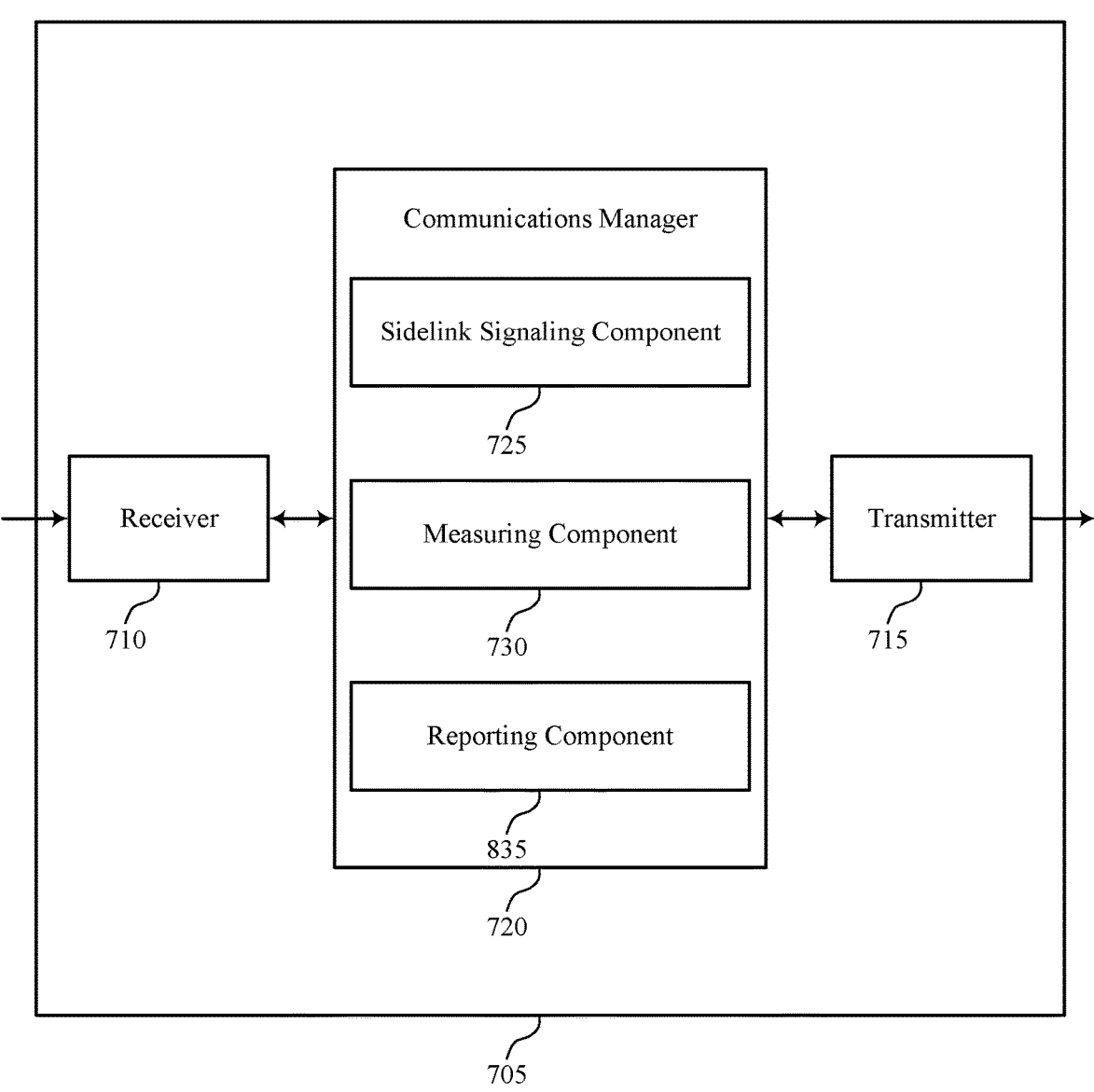

FIG. 7 shows a block diagram 700 of a device 705 that supports inter-UE CLI reporting in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to inter-UE CLI reporting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to inter-UE CLI reporting). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of inter-UE CLI reporting as described herein. For example, the communications manager 720 may include a sidelink signaling component 725, a measuring component 730, a reporting component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first UE in accordance with examples as disclosed herein. The sidelink signaling component 725 may be configured as or otherwise support a means for receiving sidelink signaling from one or more other UEs. The measuring component 730 may be configured as or otherwise support a means for generating measurement information associated with inter-UE CLI between the first UE and the one or more other UEs based on the sidelink signaling. The reporting component 735 may be configured as or otherwise support a means for transmitting, to a network entity, an inter-UE CLI report that includes information indicative of a first set of one or more UEs from among the one or more other UEs, where each UE of the first set of one or more UEs is associated with respective measurement information of the measurement information that satisfies a threshold.

Figure 8:
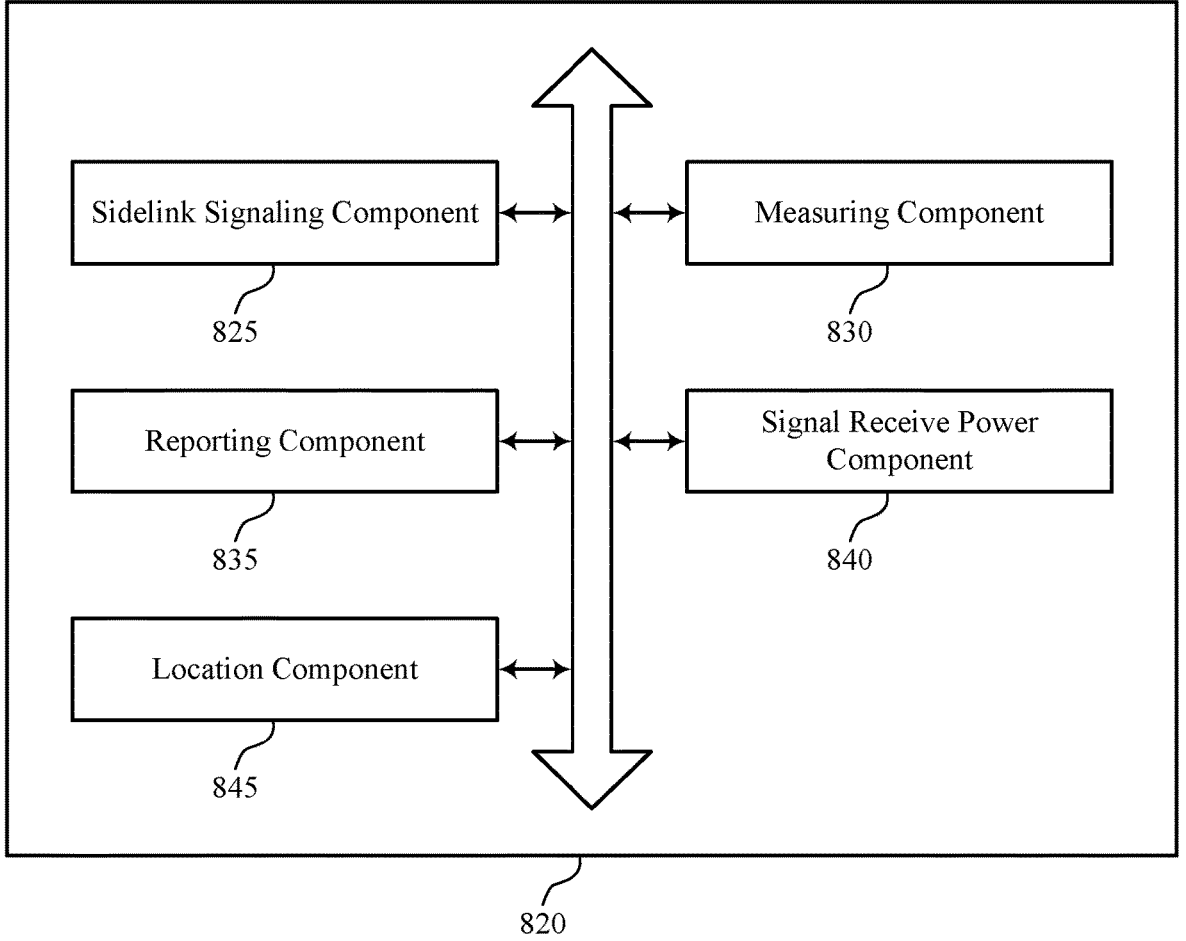
FIG. 8 shows a block diagram of a communications manager that supports inter-UE CLI reporting in accordance with one or more aspects of the present disclosure.

FIG. 8 shows a block diagram 800 of a communications manager 820 that supports inter-UE CLI reporting in accordance with one or more aspects of the present disclosure. The communications manager 820 may be an example of aspects of a communications manager 620, a communications manager 720, or both, as described herein. The communications manager 820, or various components thereof, may be an example of means for performing various aspects of inter-UE CLI reporting as described herein. For example, the communications manager 820 may include a sidelink signaling component 825, a measuring component 830, a reporting component 835, a signal receive power component 840, a location component 845, or any combination thereof. Each of these components may communicate, directly or indirectly, with one another (e.g., via one or more buses).

The communications manager 820 may support wireless communications at a first UE in accordance with examples as disclosed herein. The sidelink signaling component 825 may be configured as or otherwise support a means for receiving sidelink signaling from one or more other UEs. The measuring component 830 may be configured as or otherwise support a means for generating measurement information associated with inter-UE CLI between the first UE and the one or more other UEs based on the sidelink signaling. The reporting component 835 may be configured as or otherwise support a means for transmitting, to a network entity, an inter-UE CLI report that includes information indicative of a first set of one or more UEs from among the one or more other UEs, where each UE of the first set of one or more UEs is associated with respective measurement information of the measurement information that satisfies a threshold.

In some examples, the information indicative of the first set of one or more UEs includes a respective identifier for each respective UE of the first set of one or more UEs.

In some examples, the measurement information includes a respective signal receive power for each respective UE of the one or more other UEs, and the signal receive power component 840 may be configured as or otherwise support a means for determining, from among the one or more other UEs, one or more UEs for which the respective signal receive power exceeds the threshold, where the first set of one or more UEs includes the one or more UEs for which the respective signal receive power exceeds the threshold.

In some examples, the measurement information includes a respective signal receive power for each respective UE of the one or more other UEs, and the signal receive power component 840 may be configured as or otherwise support a means for determining, from among the one or more other UEs, one or more UEs for which the respective signal receive power is below the threshold, where the first set of one or more UEs includes the one or more UEs for which the respective signal receive power is below the threshold.

In some examples, the reporting component 835 may be configured as or otherwise support a means for receiving information indicative of a quantity of UEs for the first UE to indicate in the inter-UE CLI report via the information indicative of the first set of one or more UEs. In some examples, the signal receive power component 840 may be configured as or otherwise support a means for determining, from among the one or more other UEs, a subset of one or more UEs including the quantity of UEs, where the first set of one or more UEs includes the subset of one or more UEs, and where each UE of the first set of one or more UEs is associated with a respective measurement information value of the measurement information that is: greater than a corresponding measurement information value for each UE of the one or more other UEs not in the subset, where the threshold includes a lowest respective measurement information value associated with the subset of one or more UEs, or less than a corresponding measurement information value for each UE of the one or more other UEs not in the subset, where the threshold includes a highest respective measurement information value associated with the subset of one or more UEs.

In some examples, the inter-UE CLI report includes information indicative of a respective transmit beam associated with the respective measurement information corresponding to each respective UE of the first set of one or more UEs.

In some examples, the inter-UE CLI report includes information indicative of a respective receive beam associated with the respective measurement information corresponding to each respective UE of the first set of one or more UEs.

In some examples, the inter-UE CLI report includes information indicative of respective time and frequency resources associated with the respective measurement information corresponding to each respective UE of the first set of one or more UEs.

In some examples, the inter-UE CLI report includes information indicative of a respective pathloss between each respective UE of the first set of one or more UEs and the first UE.

In some examples, the inter-UE CLI report includes first information indicative of whether each respective UE of the first set of one or more UEs is within a coverage area of a network that includes the network entity.

In some examples, for each respective UE of the first set of one or more UEs that is within the coverage area of the network, the first information is indicative of a network cell identifier associated with the respective UE.

In some examples, for each respective UE of the first set of one or more UEs that is outside the coverage area of the network, the first information is indicative of a respective invalid cell identifier or no cell identifier.

In some examples, the inter-UE CLI report excludes information indicative of a second set of one or more UEs from the one or more other UEs based on each respective UE of the second set of one or more UEs being outside a coverage area of a network that includes the network entity.

In some examples, a particular UE from among the one or more other UEs is associated with respective measurement information that satisfies the threshold. In some examples, the inter-UE CLI report excludes information indicative of the particular UE based on the particular UE being outside a coverage area of a network that includes the network entity.

In some examples, the sidelink signaling from the one or more other UEs is associated with one or more beams that are also associated with uplink or downlink communication between the network entity and the one or more other UEs.

In some examples, the sidelink signaling from the one or more other UEs is associated with one or more first beams that are quasi-colocated with one or more second beams associated with uplink or downlink communication between the network entity and the one or more other UEs.

In some examples, the inter-UE CLI report includes information indicative of respective location information corresponding to each respective UE of the first set of one or more UEs.

In some examples, the location component 845 may be configured as or otherwise support a means for receiving second information indicative of respective location information corresponding to each of the one or more other UEs.

In some examples, the inter-UE CLI report excludes information indicative of a second set of one or more UEs from the one or more other UEs based on each respective UE of the second set of one or more UEs being greater than a threshold distance away from the first UE.

In some examples, each respective UE of the first set of one or more UEs is within a threshold distance of the first UE. In some examples, the inter-UE CLI report includes the information indicative of the first set of one or more UEs based on each respective UE of the first set of one or more UEs being within the threshold distance.

In some examples, the sidelink signaling includes one or more discovery signals, one or more SSBs, or one or more SCI transmissions.

In some examples, the measuring component 830 may be configured as or otherwise support a means for identifying, from among the one or more other UEs, a UE associated with respective measurement information that satisfies the threshold. In some examples, the location component 845 may be configured as or otherwise support a means for refraining from indicating the UE in the interference report based on the UE being outside a coverage area of a network that includes the network entity.

In some examples, the location component 845 may be configured as or otherwise support a means for determining that the one or more indicated UEs are each within a threshold distance of the first UE, the one or more indicated UEs being indicated by the interference report based on the one or more indicated UEs each being within the threshold distance of the first UE.

Figure 9:
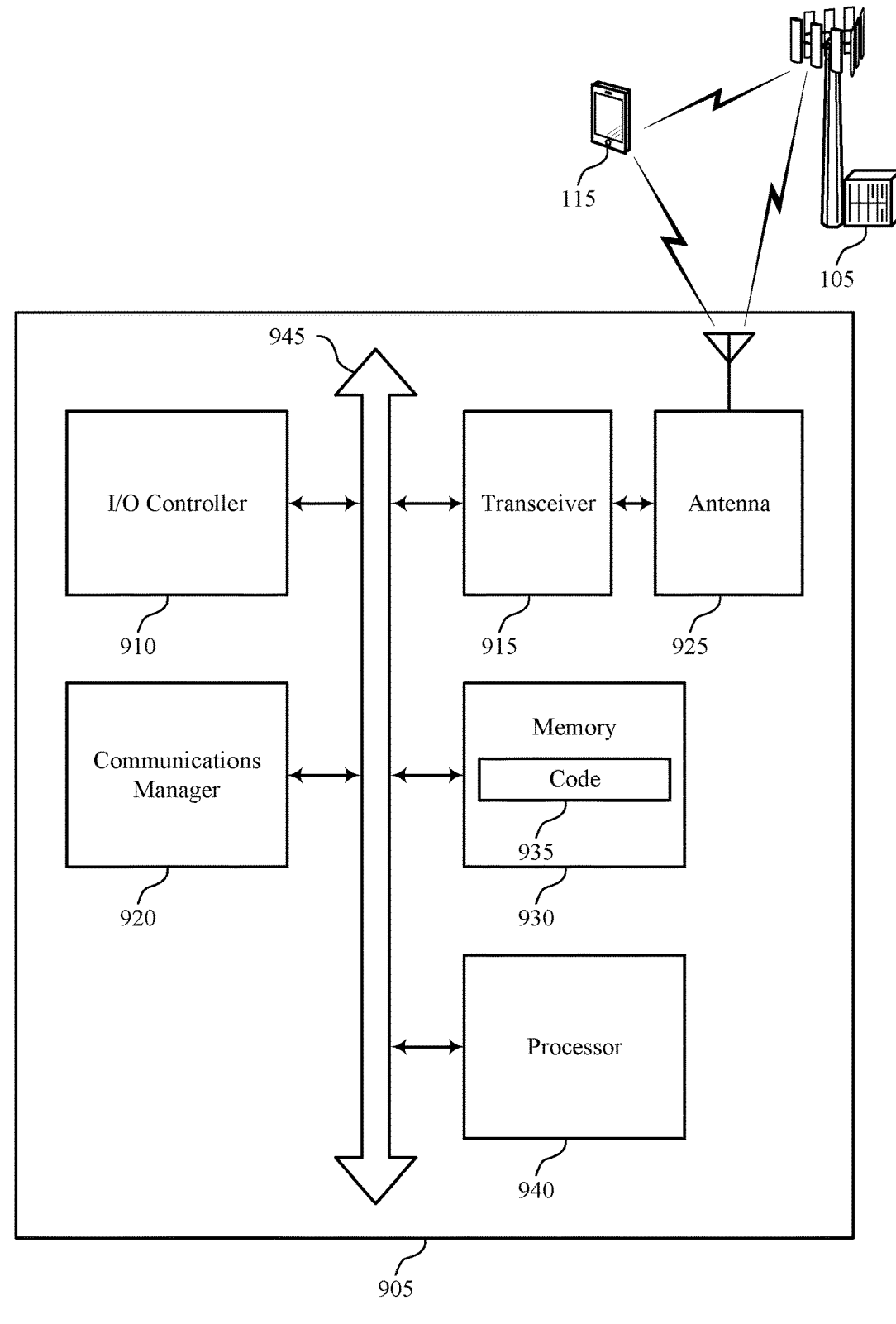
FIG. 9 shows a diagram of a system including a device that supports inter-UE CLI reporting in accordance with one or more aspects of the present disclosure.

FIG. 9 shows a diagram of a system 900 including a device 905 that supports inter-UE CLI reporting in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting inter-UE CLI reporting). For example, the device 905 or a component of the device 905 may include a processor 940 and memory 930 coupled with or to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for receiving sidelink signaling from one or more other UEs. The communications manager 920 may be configured as or otherwise support a means for generating measurement information associated with inter-UE CLI between the first UE and the one or more other UEs based on the sidelink signaling. The communications manager 920 may be configured as or otherwise support a means for transmitting, to a network entity, an inter-UE CLI report that includes information indicative of a first set of one or more UEs from among the one or more other UEs, where each UE of the first set of one or more UEs is associated with respective measurement information of the measurement information that satisfies a threshold.

By including or configuring the communications manager 920 in accordance with examples as described herein, the device 905 may support techniques for inter-UE CLI mitigation which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of inter-UE CLI reporting as described herein, or the processor 940 and the memory 930 may be otherwise configured to perform or support such operations.

Figure 10:
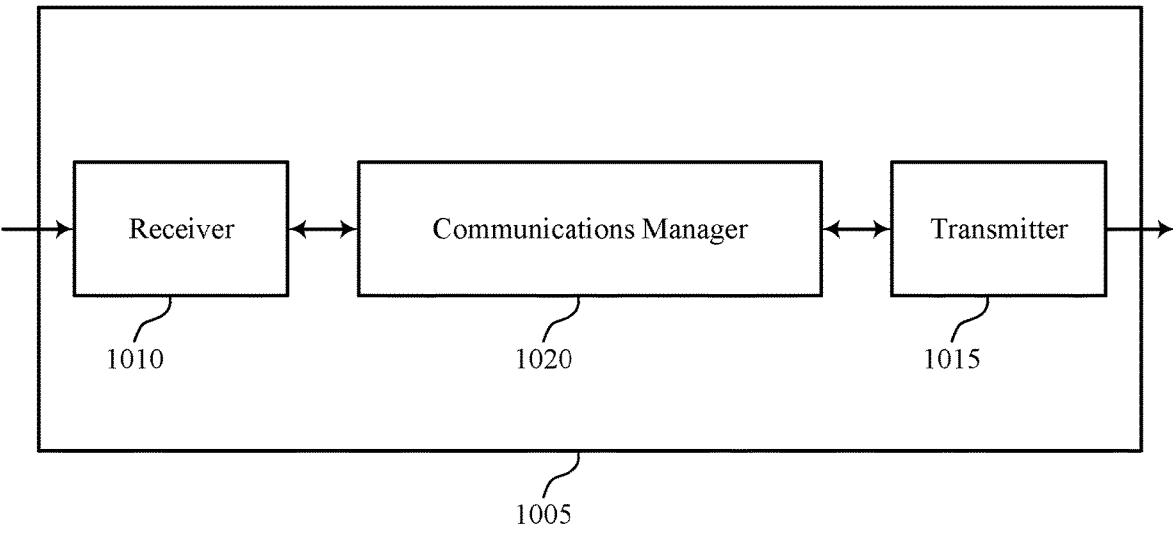
FIGS. 10 and 11 show block diagrams of devices that supports inter-UE CLI reporting in accordance with one or more aspects of the present disclosure.

FIG. 10 shows a block diagram 1000 of a device 1005 that supports inter-UE CLI reporting in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of inter-UE CLI reporting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity communication in accordance with examples as disclosed herein. For example, the communications manager 1020 may be configured as or otherwise support a means for establishing respective connections with a first UE and one or more other UEs. The communications manager 1020 may be configured as or otherwise support a means for obtaining, from the first UE, an inter-UE CLI report that includes information indicative of a first set of one or more UEs from among the one or more other UEs, the inter-UE CLI report based on interference between the first set of one or more UEs and the first UE. The communications manager 1020 may be configured as or otherwise support a means for communicating with the first UE and the first set of one or more UEs based on the inter-UE CLI report.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for inter-UE CLI mitigation which may result in reduced processing, reduced power consumption, and more efficient utilization of communication resources, among other advantages.

Figure 11:
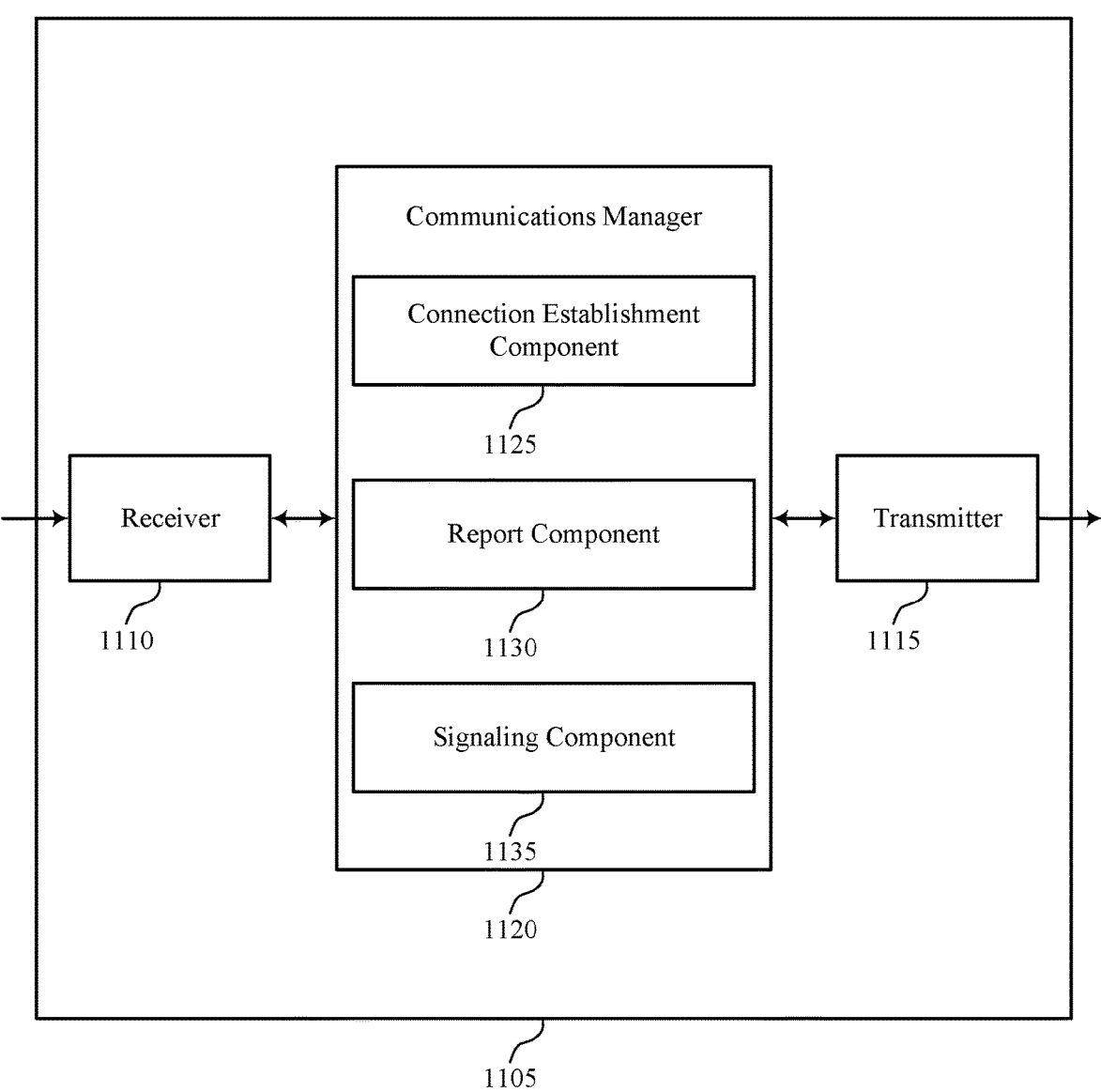

FIG. 11 shows a block diagram 1100 of a device 1105 that supports inter-UE CLI reporting in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of inter-UE CLI reporting as described herein. For example, the communications manager 1120 may include a connection establishment component 1125, a report component 1130, a signaling component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity communication in accordance with examples as disclosed herein. The connection establishment component 1125 may be configured as or otherwise support a means for establishing respective connections with a first UE and one or more other UEs. The report component 1130 may be configured as or otherwise support a means for obtaining, from the first UE, an inter-UE CLI report that includes information indicative of a first set of one or more UEs from among the one or more other UEs, the inter-UE CLI report based on interference between the first set of one or more UEs and the first UE. The signaling component 1135 may be configured as or otherwise support a means for communicating with the first UE and the first set of one or more UEs based on the inter-UE CLI report.

Figure 12:
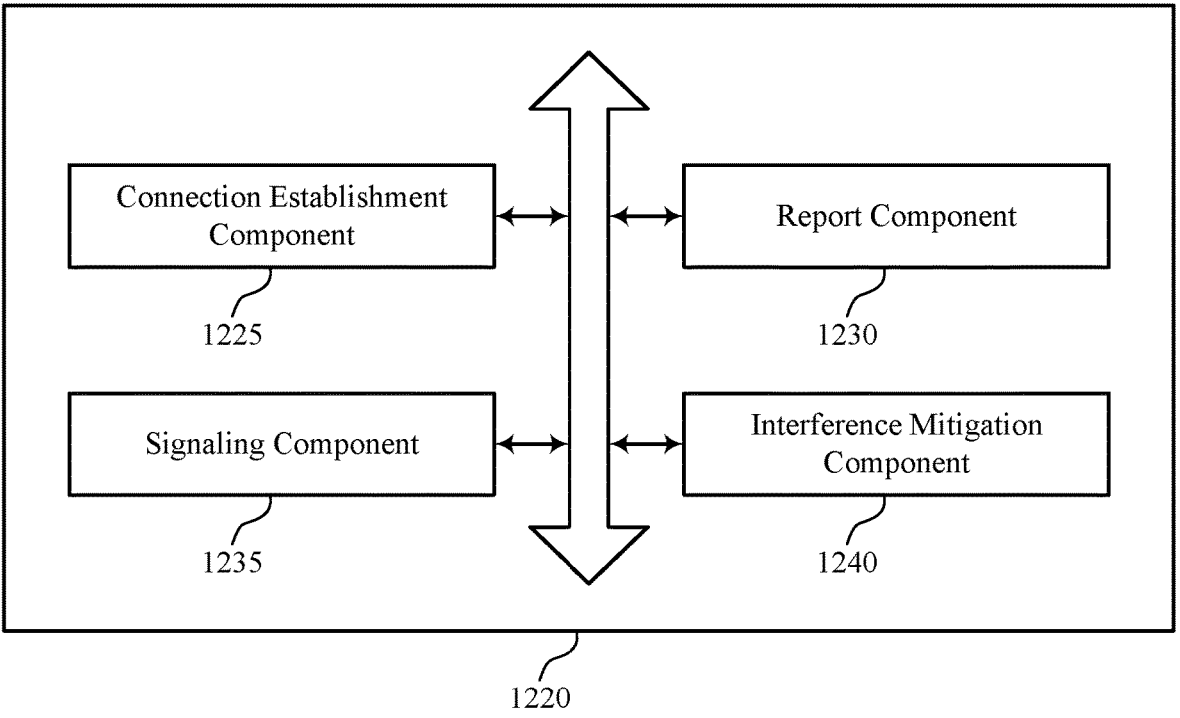
FIG. 12 shows a block diagram of a communications manager that supports inter-UE CLI reporting in accordance with one or more aspects of the present disclosure.

FIG. 12 shows a block diagram 1200 of a communications manager 1220 that supports inter-UE CLI reporting in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of inter-UE CLI reporting as described herein. For example, the communications manager 1220 may include a connection establishment component 1225, a report component 1230, a signaling component 1235, an interference mitigation component 1240, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity communication in accordance with examples as disclosed herein. The connection establishment component 1225 may be configured as or otherwise support a means for establishing respective connections with a first UE and one or more other UEs. The report component 1230 may be configured as or otherwise support a means for obtaining, from the first UE, an inter-UE CLI report that includes information indicative of a first set of one or more UEs from among the one or more other UEs, the inter-UE CLI report based on interference between the first set of one or more UEs and the first UE. The signaling component 1235 may be configured as or otherwise support a means for communicating with the first UE and the first set of one or more UEs based on the inter-UE CLI report.

In some examples, the information indicative of the first set of one or more UEs includes a respective identifier for each respective UE of the first set of one or more UEs. In some examples, each of the first set of one or more UEs is associated with respective measurement information that satisfies a threshold.

In some examples, the inter-UE CLI report includes information indicative of a respective transmit beam or a respective receive beam associated with respective measurement information corresponding to each respective UE of the first set of one or more UEs.

In some examples, the inter-UE CLI report includes first information indicative of whether each respective UE of the first set of one or more UEs is within a coverage area of a network that includes the network entity.

In some examples, outputting a control message indicating that the first UE is to refrain from indicating via the information in the inter-UE CLI report any UE that is outside a coverage area of a network that includes the network entity.

In some examples, the interference between the first set of one or more UEs and the first UE is associated with one or more beams that are also associated with uplink or downlink communication between the network entity and the first set of one or more UEs.

In some examples, the interference between the first set of one or more UEs and the first UE is associated with one or more first beams that are quasi-colocated with one or more second beams associated with uplink or downlink communication between the network entity and the first set of one or more UEs.

In some examples, the inter-UE CLI report includes information indicative of respective location information corresponding to each respective UE of the first set of one or more UEs.

In some examples, performing interference mitigation based on the inter-UE CLI report. In some examples, communicating with the first UE and the first set of one or more UEs based on the interference mitigation.

Figure 13:
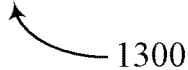
FIG. 13 shows a diagram of a system including a device that supports inter-UE CLI reporting in accordance with one or more aspects of the present disclosure.

FIG. 13 shows a diagram of a system 1300 including a device 1305 that supports inter-UE CLI reporting in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting inter-UE CLI reporting). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305 and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105 and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity communication in accordance with examples as disclosed herein. For example, the communications manager 1320 may be configured as or otherwise support a means for establishing respective connections with a first UE and one or more other UEs. The communications manager 1320 may be configured as or otherwise support a means for obtaining, from the first UE, an inter-UE CLI report that includes information indicative of a first set of one or more UEs from among the one or more other UEs, the inter-UE CLI report based on interference between the first set of one or more UEs and the first UE. The communications manager 1320 may be configured as or otherwise support a means for communicating with the first UE and the first set of one or more UEs based on the inter-UE CLI report.

By including or configuring the communications manager 1320 in accordance with examples as described herein, the device 1305 may support techniques for inter-UE CLI mitigation which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of inter-UE CLI reporting as described herein, or the processor 1335 and the memory 1325 may be otherwise configured to perform or support such operations.

FIG. 14 shows a flowchart illustrating a method 1400 that supports inter-UE CLI reporting in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving sidelink signaling from one or more other UEs. The operations of 1405 may be performed in accordance with examples as disclosed herein. In some examples, aspects of the operations of 1405 may be performed by a sidelink signaling component 825 as described with reference to FIG. 8.

At 1410, the method may include generating measurement information associated with inter-UE CLI between the first UE and the one or more other UEs based on the sidelink signaling. The operations of 1410 may be performed in accordance with examples as disclosed herein. In some examples, aspects of the operations of 1410 may be performed by a measuring component 830 as described with reference to FIG. 8.

At 1415, the method may include transmitting, to a network entity, an inter-UE CLI report that includes information indicative of a first set of one or more UEs from among the one or more other UEs, where each UE of the first set of one or more UEs is associated with respective measurement information of the measurement information that satisfies a threshold. The operations of 1415 may be performed in accordance with examples as disclosed herein. In some examples, aspects of the operations of 1415 may be performed by a reporting component 835 as described with reference to FIG. 8.

FIG. 15 shows a flowchart illustrating a method 1500 that supports inter-UE CLI reporting in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include establishing respective connections with a first UE and one or more other UEs. The operations of 1505 may be performed in accordance with examples as disclosed herein. In some examples, aspects of the operations of 1505 may be performed by a connection establishment component 1225 as described with reference to FIG. 12.

At 1510, the method may include obtaining, from the first UE, an inter-UE CLI report that includes information indicative of a first set of one or more UEs from among the one or more other UEs, the inter-UE CLI report based on interference between the first set of one or more UEs and the first UE. The operations of 1510 may be performed in accordance with examples as disclosed herein. In some examples, aspects of the operations of 1510 may be performed by a report component 1230 as described with reference to FIG. 12.

At 1515, the method may include communicating with the first UE and the first set of one or more UEs based on the inter-UE CLI report. The operations of 1515 may be performed in accordance with examples as disclosed herein. In some examples, aspects of the operations of 1515 may be performed by a signaling component 1235 as described with reference to FIG. 12.

The following provides an overview of aspects of the present disclosure:

Aspect 1: A method for wireless communications at a first UE, comprising: receiving sidelink signaling from one or more other UEs; generating measurement information associated with inter-UE CLI between the first UE and the one or more other UEs based on the sidelink signaling; and transmitting, to a network entity, an inter-UE CLI report that includes information indicative of a first set of one or more UEs from among the one or more other UEs, wherein each UE of the first set of one or more UEs is associated with respective measurement information of the measurement information that satisfies a threshold.

Aspect 2: The method of aspect 1, wherein the information indicative of the first set of one or more UEs includes a respective identifier for each respective UE of the first set of one or more UEs.

Aspect 3: The method of any of aspects 1 through 2, wherein the measurement information comprises a respective signal receive power for each respective UE of the one or more other UEs, the method further comprising: determining, from among the one or more other UEs, one or more UEs for which the respective signal receive power exceeds the threshold, wherein the first set of one or more UEs comprises the one or more UEs for which the respective signal receive power exceeds the threshold.

Aspect 4: The method of any of aspects 1 through 3, wherein the measurement information comprises a respective signal receive power for each respective UE of the one or more other UEs, the method further comprising: determining, from among the one or more other UEs, one or more UEs for which the respective signal receive power is below the threshold, wherein the first set of one or more UEs comprises the one or more UEs for which the respective signal receive power is below the threshold Aspect 5: The method of any of aspects 1 through 4, further comprising: receiving information indicative of a quantity of UEs for the first UE to indicate in the inter-UE CLI report via the information indicative of the first set of one or more UEs; and determining, from among the one or more other UEs, a subset of one or more UEs comprising the quantity of UEs, wherein the first set of one or more UEs comprises the subset of one or more UEs, and wherein each UE of the first set of one or more UEs is associated with a respective measurement information value of the measurement information that is: greater than a corresponding measurement information value for each UE of the one or more other UEs not in the subset, wherein the threshold comprises a lowest respective measurement information value associated with the subset of one or more UEs, or less than a corresponding measurement information value for each UE of the one or more other UEs not in the subset, wherein the threshold comprises a highest respective measurement information value associated with the subset of one or more UEs.

Aspect 6: The method of any of aspects 1 through 5, wherein the inter-UE CLI report includes information indicative of a respective transmit beam associated with the respective measurement information corresponding to each respective UE of the first set of one or more UEs.

Aspect 7: The method of any of aspects 1 through 6, wherein the inter-UE CLI report includes information indicative of a respective receive beam associated with the respective measurement information corresponding to each respective UE of the first set of one or more UEs.

Aspect 8: The method of any of aspects 1 through 7, wherein the inter-UE CLI report includes information indicative of respective time and frequency resources associated with the respective measurement information corresponding to each respective UE of the first set of one or more UEs.

Aspect 9: The method of any of aspects 1 through 8, wherein the inter-UE CLI report includes information indicative of a respective pathloss between each respective UE of the first set of one or more UEs and the first UE.

Aspect 10: The method of any of aspects 1 through 9, wherein the inter-UE CLI report includes first information indicative of whether each respective UE of the first set of one or more UEs is within a coverage area of a network that comprises the network entity.

Aspect 11: The method of aspect 10, wherein for each respective UE of the first set of one or more UEs that is within the coverage area of the network, the first information is indicative of a network cell identifier associated with the respective UE.

Aspect 12: The method of any of aspects 10 through 11, wherein for each respective UE of the first set of one or more UEs that is outside the coverage area of the network, the first information is indicative of a respective invalid cell identifier or no cell identifier.

Aspect 13: The method of any of aspects 1 through 11, wherein the inter-UE CLI report excludes information indicative of a second set of one or more UEs from the one or more other UEs based on each respective UE of the second set of one or more UEs being outside a coverage area of a network that comprises the network entity.

Aspect 14: The method of any of aspects 1 through 13, wherein a particular UE from among the one or more other UEs is associated with respective measurement information that satisfies the threshold, and the inter-UE CLI report excludes information indicative of the particular UE based on the particular UE being outside a coverage area of a network that comprises the network entity.

Aspect 15: The method of any of aspects 1 through 14, wherein the sidelink signaling from the one or more other UEs is associated with one or more beams that are also associated with uplink or downlink communication between the network entity and the one or more other UEs.

Aspect 16: The method of any of aspects 1 through 15, wherein the sidelink signaling from the one or more other UEs is associated with one or more first beams that are QCL'ed with one or more second beams associated with uplink or downlink communication between the network entity and the one or more other UEs.

Aspect 17: The method of any of aspects 1 through 16, wherein the inter-UE CLI report includes information indicative of respective location information corresponding to each respective UE of the first set of one or more UEs.

Aspect 18: The method of aspect 17, further comprising: receiving second information indicating of respective indication of respective location information corresponding to each of the one or more other UEs.

Aspect 19: The method of any of aspects 17 through 18, wherein the inter-UE CLI report excludes information indicative of a second set of one or more UEs from the one or more other UEs based on each respective UE of the second set of one or more UEs being greater than a threshold distance away from the first UE.

Aspect 20: The method of any of aspects 17 through 19, wherein each respective UE of the first set of one or more UEs is within a threshold distance of the first UE, and the inter-UE CLI report includes the information indicative of the first set of one or more UEs based on each respective UE of the first set of one or more UEs being within the threshold distance.

Aspect 21: The method of any of aspects 1 through 20, wherein the sidelink signaling comprises one of more discovery signals, one or more SSBs, or one or more SCI transmissions.

Aspect 22: A method for wireless communications at a network entity communication, comprising: establishing respective connections with a first UE and one or more other UEs; obtaining, from the first UE, an inter-UE CLI report that includes information indicative of a first set of one or more UEs from among the one or more other UEs, the inter-UE CLI report based on interference between the first set of one or more UEs and the first UE; and communicating with the first UE and the first set of one or more UEs based on the inter-UE CLI report.

Aspect 23: The method of aspect 22, wherein the information indicative of the first set of one or more UEs includes a respective identifier for each respective UE of the first set of one or more UEs, and each of the first set of one or more UEs is associated with respective measurement information that satisfies a threshold.

Aspect 24: The method of any of aspects 22 through 23, wherein the inter-UE CLI report includes information indicative of a respective transmit beam or a respective receive beam associated with respective measurement information corresponding to each respective UE of the first set of one or more UEs.

Aspect 25: The method of any of aspects 22 through 24, wherein the inter-UE CLI report includes first information indicative of whether each respective UE of the first set of one or more UEs is within a coverage area of a network that comprises the network entity.

Aspect 26: The method of any of aspects 22 through 25, wherein the at least one processor is further configured to outputting a control message indicating that the first UE is to refrain from indicating via the information in the inter-UE CLI report any UE that is outside a coverage area of a network that comprises the network entity.

Aspect 27: The method of any of aspects 22 through 26, wherein the interference between the first set of one or more UEs and the first UE is associated with one or more beams that are also associated with uplink or downlink communication between the network entity and the first set of one or more UEs.

Aspect 28: The method of any of aspects 22 through 27, wherein the interference between the first set of one or more UEs and the first UE is associated with one or more first beams that are QCL'ed with one or more second beams associated with uplink or downlink communication between the network entity and the first set of one or more UEs.

Aspect 29: The method of any of aspects 22 through 28, wherein the inter-UE CLI report includes information indicative of respective location information corresponding to each respective UE of the first set of one or more UEs.

Aspect 30: The method of any of aspects 22 through 29, wherein, to communicate with the first UE and the first set of one or more UEs based on the inter-UE CLI report, the at least one processor is configured to performing interference mitigation based on the inter-UE CLI report; and communicating with the first UE and the first set of one or more UEs based on the interference mitigation.

Aspect 31: An apparatus for wireless communications at a first UE, comprising a processor; memory coupled with the processor; and instructions stored in the memory and executable by the processor to cause the apparatus to perform a method of any of aspects 1 through 21.

Aspect 32: An apparatus for wireless communications at a first UE, comprising at least one means for performing a method of any of aspects 1 through 21.

Aspect 33: A non-transitory computer-readable medium storing code for wireless communications at a first UE, the code comprising instructions executable by a processor to perform a method of any of aspects 1 through 21.

Aspect 34: An apparatus for wireless communications at a network entity communication, comprising a processor;

memory coupled with the processor; and instructions stored in the memory and executable by the processor to cause the apparatus to perform a method of any of aspects 22 through 30.

Aspect 35: An apparatus for wireless communications at a network entity communication, comprising at least one means for performing a method of any of aspects 22 through 30.

Aspect 36: A non-transitory computer-readable medium storing code for wireless communications at a network entity communication, the code comprising instructions executable by a processor to perform a method of any of aspects 22 through 30.

The methods described herein describe possible implementations, and the operations and the steps may be rearranged or otherwise modified. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects. The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE) for wireless communication, comprising:
a memory; and
at least one processor coupled to the memory, wherein the at least one processor is configured to:
receive configuration information indicative of a quantity of UEs for the first UE to indicate in an inter-UE cross link interference report;
receive sidelink signaling from one or more other UEs;
generate measurement information associated with inter-UE cross link interference between the first UE and the one or more other UEs based on the sidelink signaling; and
transmit, to a network entity, the inter-UE cross link interference report that includes information indicative of a first set of one or more UEs from among the one or more other UEs, wherein the first set of one or more UEs comprises the quantity of UEs in accordance with the configuration information, and wherein whether a UE is included in the first set of one or more UEs is in accordance with whether the UE is associated with respective measurement information that satisfies a threshold.

2. The first UE of claim 1, wherein the information indicative of the first set of one or more UEs includes a respective identifier for each respective UE of the first set of one or more UEs.

3. The first UE of claim 1, wherein the measurement information comprises a respective signal receive power for each respective UE of the one or more other UEs, and wherein the at least one processor is further configured to:
determine, from among the one or more other UEs, one or more UEs for which the respective signal receive power exceeds the threshold, wherein the first set of one or more UEs comprises the one or more UEs for which the respective signal receive power exceeds the threshold.

4. The first UE of claim 1, wherein the measurement information comprises a respective signal receive power for each respective UE of the one or more other UEs, and wherein the at least one processor is further configured to:

determine, from among the one or more other UEs, one or more UEs for which the respective signal receive power is below the threshold, wherein the first set of one or more UEs comprises the one or more UEs for which the respective signal receive power is below the threshold.

5. The first UE of claim 1, wherein the at least one processor is further configured to:

determine, from among the one or more other UEs, a subset of one or more UEs comprising the quantity of UEs, wherein the first set of one or more UEs comprises the subset of one or more UEs, and wherein each UE of the first set of one or more UEs is associated with a respective measurement information value of the measurement information that is:

greater than a corresponding measurement information value for each UE of the one or more other UEs not in the subset of one or more UEs, wherein the threshold comprise a lowest respective measurement information value associated with the subset of one or more UEs, or less than a corresponding measurement information value for each UE of the one or more other UEs not in the subset of one or more UEs, wherein the threshold comprise a highest respective measurement information value associated with the subset of one or more UEs.

6. The first UE of claim 1, wherein the inter-UE cross link interference report includes information indicative of a respective pathloss between each respective UE of the first set of one or more UEs and the first UE.

7. A network entity for wireless communication, comprising:

a memory; and at least one processor coupled to the memory, wherein the at least one processor is configured to:

establish respective connections with a first user equipment (UE) and one or more other UEs;

output, to the first UE, configuration information indicative of a quantity of UEs for the first UE to indicate in an inter-UE cross link interference report;

receive, from the first UE, the inter-UE cross link interference report that includes information indicative of a first set of one or more UEs from among the one or more other UEs, wherein the first set of one or more UEs comprises the quantity of UEs in accordance with the configuration information, wherein the inter-UE cross link interference report is based on interference between the first set of one or more UEs and the first UE, and wherein whether a UE is included in the first set of one or more UEs is in accordance with whether the UE is associated with respective measurement information that satisfies a threshold; and communicate with the first UE and the first set of one or more UEs based on the inter-UE cross link interference report.

8. The network entity of claim 7, wherein the information indicative of the first set of one or more UEs includes a respective identifier for each respective UE of the first set of one or more UEs.

9. The network entity of claim 7, wherein, to communicate with the first UE and the first set of one or more UEs based on the inter-UE cross link interference report, the at least one processor is configured to:

perform interference mitigation based on the inter-UE cross link interference report; and communicate with the first UE and the first set of one or more UEs based on the interference mitigation.

10. A method of wireless communication performed by a first user equipment (UE), comprising:

receiving configuration information indicative of a quantity of UEs for the first UE to indicate in an inter-UE cross link interference report;

receiving sidelink signaling from one or more other UEs;

generating measurement information associated with inter-UE cross link interference between the first UE and the one or more other UEs based on the sidelink signaling; and transmitting, to a network entity, the inter-UE cross link interference report that includes information indicative of a first set of one or more UEs from among the one or more other UEs, wherein the first set of one or more UEs comprises the quantity of UEs in accordance with the configuration information, and wherein whether a UE is included in the first set of one or more UEs is in accordance with whether the UE is associated with respective measurement information that satisfies a threshold.

11. A method of wireless communication performed by a network entity, comprising:

establishing respective connections with a first user equipment (UE) and one or more other UEs;

outputting, to the first UE, configuration information indicative of a quantity of UEs for the first UE to indicate in an inter-UE cross link interference report;

obtaining, from the first UE, the inter-UE cross link interference report that includes information indicative of a first set of one or more UEs from among the one or more other UEs, wherein the first set of one or more UEs comprises the quantity of UEs in accordance with the configuration information, wherein the inter-UE cross link interference report is based on interference between the first set of one or more UEs and the first UE, and wherein whether a UE is included in the first set of one or more UEs is in accordance with whether the UE is associated with respective measurement information that satisfies a threshold; and communicating with the first UE and the first set of one or more UEs based on the inter-UE cross link interference report.

12. The method of claim 11, wherein the information indicative of the first set of one or more UEs includes a respective identifier for each respective UE of the first set of one or more UEs.

13. The method of claim 11, wherein communicating with the first UE and the first set of one or more UEs based on the inter-UE cross link interference report comprises:

performing interference mitigation based on the inter-UE cross link interference report; and communicating with the first UE and the first set of one or more UEs based on the interference mitigation.

14. The method of claim 11, wherein the inter-UE cross link interference report includes the information indicative of the first set of one or more UEs in accordance with each UE of the first set of one or more UEs being associated with respective measurement information that satisfies the threshold and in accordance with each UE of the first set of one or more UEs being within a threshold distance from the first UE.

15. The first UE of claim 1, wherein the at least one processor is further configured to:

identify a second set of one or more UEs from among the one or more other UEs, wherein each UE of the second set of one or more UEs is associated with respective measurement information that satisfies the threshold; and identify the first set of one or more UEs from among the second set of one or more UEs in accordance with each UE of the first set of one or more UEs being less than a threshold distance from the first UE.

16. The first UE of claim 1, wherein the sidelink signaling comprises one or more discovery signals, one or more synchronization signal blocks, or one or more sidelink control information messages.

17. The network entity of claim 7, wherein the first set of one or more UEs comprises one or more UEs from the one or more other UEs for which a respective signal receive power exceeds the threshold.

18. The network entity of claim 7, wherein the first set of one or more UEs comprises one or more UEs from the one or more other UEs for which a respective signal receive power is below the threshold.

19. The network entity of claim 7, wherein the inter-UE cross link interference report includes information indicative of a respective pathloss between each respective UE of the first set of one or more UEs and the first UE.

20. The network entity of claim 7, wherein the inter-UE cross link interference report includes information indicative of the first set of one or more UEs in accordance with each UE of the first set of one or more UEs being associated with respective measurement information that satisfies the threshold and in accordance with each UE of the first set of one or more UEs being within a threshold distance from the first UE.

21. The method of claim 10, wherein the information indicative of the first set of one or more UEs includes a respective identifier for each respective UE of the first set of one or more UEs.

22. The method of claim 10, wherein the measurement information comprises a respective signal receive power for each respective UE of the one or more other UEs, and wherein the method further comprises:

determining, from among the one or more other UEs, one or more UEs for which the respective signal receive power exceeds the threshold, wherein the first set of one or more UEs comprises the one or more UEs for which the respective signal receive power exceeds the threshold.

23. The method of claim 10, wherein the measurement information comprises a respective signal receive power for each respective UE of the one or more other UEs, and wherein the method further comprises:

determining, from among the one or more other UEs, one or more UEs for which the respective signal receive power is below the threshold, wherein the first set of one or more UEs comprises the one or more UEs for which the respective signal receive power is below the threshold.

24. The method of claim 10, further comprising:

determining, from among the one or more other UEs, a subset of one or more UEs comprising the quantity of UEs, wherein the first set of one or more UEs comprises the subset of one or more UEs, and wherein each UE of the first set of one or more UEs is associated with a respective measurement information value of the measurement information that is:

greater than a corresponding measurement information value for each UE of the one or more other UEs not in the subset of one or more UEs, wherein the threshold comprise a lowest respective measurement information value associated with the subset of one or more UEs, or less than a corresponding measurement information value for each UE of the one or more other UEs not in the subset of one or more UEs, wherein the threshold comprise a highest respective measurement information value associated with the subset of one or more UEs.

25. The method of claim 10, wherein the inter-UE cross link interference report includes information indicative of a respective pathloss between each respective UE of the first set of one or more UEs and the first UE.

26. The method of claim 10, further comprising:

identifying a second set of one or more UEs from among the one or more other UEs, wherein each UE of the second set of one or more UEs is associated with respective measurement information that satisfies the threshold; and identifying the first set of one or more UEs from among the second set of one or more UEs in accordance with each UE of the first set of one or more UEs being less than a threshold distance from the first UE.

27. The method of claim 10, wherein the sidelink signaling comprises one or more discovery signals, one or more synchronization signal blocks, or one or more sidelink control information messages.

28. The network entity of claim 9, wherein, to perform the interference mitigation, the at least one processor is configured to:

coordinate the interference mitigation with a second network entity in accordance with a second UE being associated with a first subset of measurement information that satisfies the threshold and in accordance with the second network entity being in communication with the second UE.

29. The method of claim 13, wherein performing the interference mitigation comprises:

coordinating the interference mitigation with a second network entity in accordance with a second UE being associated with a first subset of measurement information that satisfies the threshold and in accordance with the second network entity being in communication with the second UE.

* * * * *